(12) United States Patent
Lu et al.

(10) Patent No.: US 11,882,552 B2
(45) Date of Patent: *Jan. 23, 2024

(54) SWITCHING BETWEEN DIFFERENT COMMUNICATION PROTOCOLS

(71) Applicant: Meta Platforms Technologies, LLC, Menlo Park, CA (US)

(72) Inventors: Gang Lu, Pleasanton, CA (US); Nihar Doshi, Fremont, CA (US); Jiwon Steve Han, San Ramon, CA (US); Xiaoguang Wang, Sunnyvale, CA (US); Dong Zheng, Saratoga, CA (US); Chunyu Hu, Saratoga, CA (US); Qi Qu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,588

(22) Filed: Aug. 1, 2022

(65) Prior Publication Data

US 2022/0369318 A1    Nov. 17, 2022

Related U.S. Application Data

(63) Continuation of application No. 16/867,277, filed on May 5, 2020, now Pat. No. 11,412,511.

(51) Int. Cl.
*H04W 52/02* (2009.01)
*H04W 72/0453* (2023.01)
*H04W 72/23* (2023.01)

(52) U.S. Cl.
CPC ... *H04W 72/0453* (2013.01); *H04W 52/0229* (2013.01); *H04W 72/23* (2023.01)

(58) Field of Classification Search
CPC . H04W 36/03; H04W 72/0453; H04W 72/23; H04W 52/0229; H04W 36/30; H04W 84/12; H04W 88/06; H04W 76/28
See application file for complete search history.

(56) References Cited

U.S. PATENT DOCUMENTS

| | | | |
|---|---|---|---|
| 9,635,677 B1 * | 4/2017 | Liu | H04L 1/0015 |
| 2013/0121161 A1 * | 5/2013 | Szabo | H04W 28/02 |
| | | | 370/241 |

(Continued)

OTHER PUBLICATIONS

International Search Report and Written Opinion for International Application No. PCT/US2021/029846, dated Jul. 21, 2021, 12 Pages.

*Primary Examiner* — Chi Ho A Lee
(74) *Attorney, Agent, or Firm* — Foley & Lardner LLP

(57) ABSTRACT

Disclosed herein are a system, a method and a device for switching between different communications protocols. A head wearable display can transmit, to a console during a first session interval, a first request to switch from a first link using a first communication protocol to a second link using a second communication protocol. The first request can include at least one characteristic of the first link. The head wearable display can receive, from the console, a first response to the first request, to perform a switch from the first link to the second link. The first response can indicate a wake up time and a second session interval to perform the switch. The head wearable display can switch from the first link to the second link in the second session interval and after the wake up time.

20 Claims, 14 Drawing Sheets

(56) References Cited

U.S. PATENT DOCUMENTS

| | | | |
|---|---|---|---|
| 2016/0007288 A1* | 1/2016 | Samardzija | H04W 52/0229 |
| | | | 370/311 |
| 2016/0119942 A1* | 4/2016 | Wang | H04W 72/1215 |
| | | | 370/336 |
| 2016/0155281 A1* | 6/2016 | O'Toole | H04W 12/50 |
| | | | 340/5.64 |
| 2016/0338121 A1* | 11/2016 | Wietfeldt | H04W 72/541 |
| 2017/0215113 A1* | 7/2017 | Lee | H04W 36/03 |
| 2017/0223615 A1 | 8/2017 | Lee et al. | |
| 2017/0281000 A1 | 10/2017 | Wedekind et al. | |
| 2017/0353921 A1 | 12/2017 | Li et al. | |
| 2018/0091962 A1 | 3/2018 | Hernandez et al. | |
| 2018/0132149 A1 | 5/2018 | Zhao et al. | |
| 2018/0234137 A1 | 8/2018 | Qu et al. | |
| 2018/0309500 A1 | 10/2018 | Qu et al. | |
| 2020/0128482 A1 | 4/2020 | Daoura et al. | |
| 2020/0367124 A1 | 11/2020 | Sukhija et al. | |
| 2021/0120555 A1 | 4/2021 | Badic et al. | |

* cited by examiner

SWITCHING BETWEEN DIFFERENT COMMUNICATION PROTOCOLS

CROSS-REFERENCE TO RELATED APPLICATION

This application claims the benefit of priority under 35 U.S.C. § 120 as a continuation of U.S. Non-Provisional patent application Ser. No. 16/867,277, filed on May 5, 2020, the disclosure of which is incorporated herein by reference in its entirety.

FIELD OF DISCLOSURE

The present disclosure is generally related to systems and methods for using different communication links, including but not limited to systems and methods for switching between different communication protocols.

BACKGROUND

Wearable display technologies can provide a virtual reality or augmented reality experience to a user wearing the respective display device. They can provide a series of computer generated images to allow the user to experience and/or interact with the respective images. The display device can connect to a central processing system to receive the series of images to provide to the user and receive system updates. The connection between the wearable display and the central processing system can experience issues, such as delays or failures, resulting in a reduced user experience or failure of the display device itself.

SUMMARY

Disclosed herein are embodiments of devices, systems and methods for switching between different wireless communications protocols, including but not limited to, switching between a first link established using IEEE 802.11ay to a second link established using IEEE 802.11ax as an example. Two devices, such as a console and a head wearable display, can establish one or more links to communicate and perform data transmission updates between the respective devices. The different links can be established using different wireless communications protocols (e.g., IEEE 802.11 based protocol, Bluetooth based protocol, or cellular based protocol). In some embodiments, in response to a degradation of quality (e.g., low signal to noise ratio) of a first or initial link, the head wearable display may request to switch to the second link using a different communication protocol. The console can make a determination of whether or not to switch to the second link and can transmit a response indicating a decision of the determination to the head wearable display. The console can determine to switch to the second link and can select a current or subsequent session interval between the console and head wearable display for both devices to perform the switch. For example, the console can determine that the devices should switch during a current session interval or select a next wake up time for a subsequent session interval to perform the switch. In some embodiments, the console can determine not to switch and can continue using the first link with the head wearable display to maintain the connection.

In at least one aspect, a method is provided. The method can include transmitting, by a head wearable display to a console during a first session interval, a first request to switch from a first link using a first communication protocol to a second link using a second communication protocol for communications between the head wearable display and the console. The first request can include at least one characteristic of the first link. The method can include receiving, by the head wearable display from the console, a first response to the first request, to perform a switch from the first link to the second link. The first response can indicate a wake up time and a second session interval to perform the switch. The method can include switching, by the head wearable display, from the first link to the second link in the second session interval and after the wake up time, for communications between the head wearable display and the console.

The first communication protocol or the second communication protocol can include one of: 802.11 based protocol, Bluetooth based protocol, or cellular based protocol. In some embodiments, the method can include transmitting, by the head wearable display, an acknowledgment to the console confirming receipt of the first response to switch from the first link to the second link. The method can include detecting, by the head wearable display, that a level of traffic on the second link is less than a threshold level, and determining, by the head wearable display according to the level of traffic being less than the threshold level, that the console failed to receive an acknowledgment of the first response to switch. The method can include switching, by the head wearable display, from the second link to the first link responsive to the level of traffic on the second link being less than the threshold level. In some embodiments, the method can include retransmitting, by the head wearable display to the console, the first request to switch from the first link to the second link responsive to the console failing to receive the acknowledgment. The method can include receiving, by the head wearable display from the console, a second response to switch from the first link to the second link. The method can include switching, by the head wearable display, from the first link to the second link responsive to the second response.

In some embodiments, the method can include determining, by the head wearable display in a third session interval, that a first characteristic of the first link is less than a channel quality threshold (e.g., signal to noise ratio threshold) for the first link. The method can include transmitting, by the head wearable display to the console responsive to the first characteristic being less than the channel quality threshold, a second request to switch from the first link to the second link. The method can include receiving, by the head wearable display from the console, a second response to switch from the first link to the second link in the third session interval. The method can include switching, by the head wearable display in the third session interval, from the first link to the second link. In some embodiments, the method can include receiving, by the head wearable display from the console, a second response to switch from the first link to the second link during a fourth session interval. The method can include switching, by the head wearable display in the fourth session interval, from the first link to the second link.

In some embodiments, the method can include transmitting, by the head wearable display to the console, a second request to switch from the second link to the first link. The method can include receiving, by the head wearable display from the console, a second response to switch from the first link to the second link. The second response can indicate a time to perform the switch and one or more configuration settings for the first link. The method can include switching, by the head wearable display at the indicated time, from the second link to the first link, the first link established with the one or more configuration settings.

In at least one aspect, a head wearable display is provided. The head wearable display can include at least one processor. The at least one processor can be configured to transmit, to a console during a first session interval, a first request to switch from a first link using a first communication protocol to a second link using a second communication protocol, for communications between the head wearable display and the console. The first request can include at least one characteristic of the first link. The at least one processor can be configured to receive, from the console, a first response to the first request, to perform a switch from the first link to the second link. The first response can indicate a wake up time and a second session interval to perform the switch. The at least one processor can be configured to switch, from the first link to the second link in the second session interval and after the wake up time, for communications between the head wearable display and the console.

The first communication protocol or the second communication protocol can include one of: 802.11 based protocol, Bluetooth based protocol, or cellular based protocol. The at least one processor can be configured to detect that a level of traffic on the second link is less than a threshold level. The at least one processor can be configured to determine, according to the level of traffic being less than the threshold level, that the console failed to receive an acknowledgment of the first response to switch. The at least one processor can be configured to switch from the second link to the first link. The at least one processor can be configured to retransmit, to the console, the first request to switch from the first link to the second link responsive to the console failing to receive the acknowledgment. The at least one processor can be configured to receive, from the console, a second response to switch from the first link to the second link. The at least one processor can be configured to switch from the first link to the second link responsive to the second response.

In some embodiments, the at least one processor can be configured to determine, in a third session interval, that a first characteristic of the first link is less than a channel quality threshold for the first link. The at least one processor can be configured to transmit to the console responsive to the first characteristic being less than the channel quality threshold, a second request to switch from the first link to the second link. The at least one processor can be configured to receive, from the console, a second response to switch from the first link to the second link in the third session interval. The at least one processor can be configured to switch, in the third session interval, from the first link to the second link. The at least one processor can be configured to transmit, to the console, a second request to switch from the second link to the first link. The at least one processor can be configured to receive, from the console, a second response to switch from the first link to the second link. The second response can indicate a time to perform the switch and one or more configuration settings for the first link. The at least one processor can be configured to switch, at the indicated time, from the second link to the first link, the first link established with the one or more configuration settings.

In at least one aspect, a non-transitory computer readable medium storing instructions is provided. The instructions when executed by one or more processors can cause the one or more processors to transmit, to a console during a first session interval, a first request to switch from a first link using a first communication protocol to a second link using a second communication protocol for communications between the head wearable display and the console. The first request can include at least one characteristic of the first link. The instructions when executed by one or more processors can cause the one or more processors to receive, from the console, a first response to the first request, to perform a switch from the first link to the second link. The first response can indicate a wake up time and a second session interval to perform the switch. The instructions when executed by one or more processors can cause the one or more processors to switch, from the first link to the second link during the second session interval and after the wake up time, for communications between the head wearable display and the console.

In some embodiments, the instructions when executed by one or more processors can cause the one or more processors to determine, in a third session interval, that a first characteristic of the first link is less than a channel quality threshold for the first link. The instructions when executed by one or more processors can cause the one or more processors to transmit, to the console responsive to the first characteristic being less than the channel quality threshold, a second request to switch from the first link to the second link. The instructions when executed by one or more processors can cause the one or more processors to receive, from the console, a second response to switch from the first link to the second link in the third session interval. The instructions when executed by one or more processors can cause the one or more processors to switch in the third session interval, from the first link to the second link.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1A:
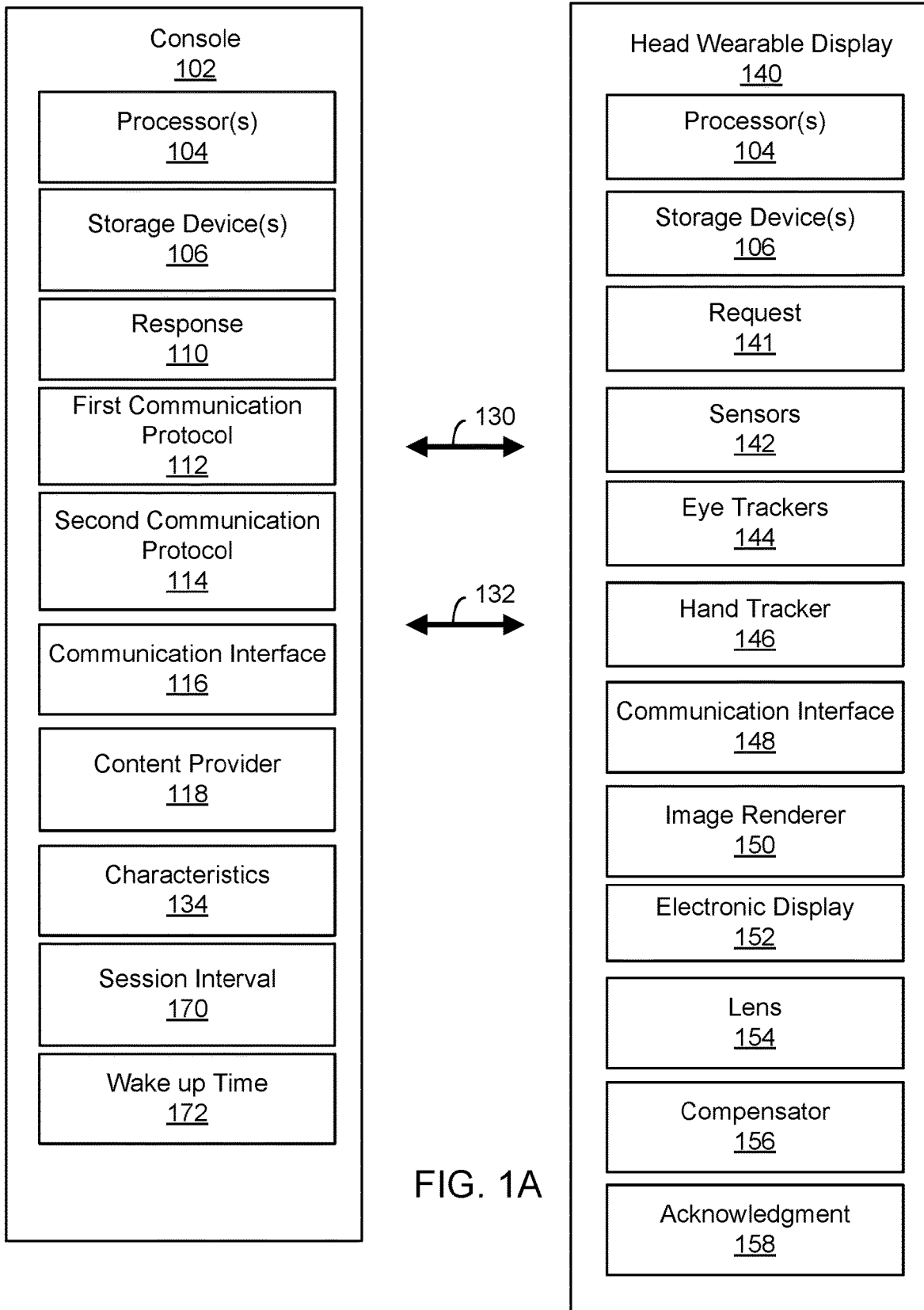
FIG. 1A is a block diagram of an embodiment of a system for switching between different communications protocols, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes embodiments of devices, systems and methods for switching between different communications protocols.

Section B describes embodiments of a computing system.

A. Switching Between Different Communications Protocols

The subject matter of this disclosure is directed to switching between different wireless communication protocols, for example, between a first link established using a first communication protocol (e.g., IEEE 802.11ay) and a second link established using a second, different communication protocol (e.g., IEEE 802.11ax). A device (e.g., console) and a head wearable display (e.g., glasses) can communicate using a primary or secondary link during data transmission intervals between the respective devices. The device or head wearable display (HWD) can detect a degradation of quality of the channel or failure of the channel. For example, the device and the HWD can initially establish channels using a first communication protocol. The first or initial communication protocol may correspond to a preferred communication protocol for performing data transmission intervals between the device and the HWD. In some embodiments, the second or different communication protocol can operate differently from, or include different properties than that of the first or initial communication protocol. For example, the second communication protocol can operate in a different frequency band, provide a different speed or data rate and/or provide a different reliability (e.g., slower data rate, increased reliability) as compared to the first or initial communication protocol. However, the communication channel may experience degradation (e.g., reduced data rates) or failure such that the device and HWD can no longer communicate using the first communication protocol.

The devices, systems and methods described herein can include the HWD transmitting a request to switch from a primary link using a first communication protocol (e.g., IEEE 802.11ay) to a secondary link using a second communication protocol (e.g., IEEE 802.11ax). The device can generate a switching decision to stay on the primary link using the first communication protocol or to switch to the secondary link using the second communication protocol, and can provide the switching decision to the HWD. The switching decision can identify a time or system interval to switch to the different communication protocol, a subsequent wake up time, an activity type and/or a duration to remain on the new communication protocol. The device and HWD can each include a host driver (sometimes referred to as a host) to transmit and receive requests and/or switching decisions.

In some embodiments, the device can determine to stay on the primary link using the first communication protocol. For example, the host driver on the HWD can transmit a request to the device to switch from the first communication protocol to the second communication protocol and include one or more reasons, such as but not limited to a quality level of the channel using the first communication protocol. The host driver on the device can determine to maintain the communications using the first communication protocol and can transmit a switching decision to the HWD to instruct the HWD to continue to transmit using the first communication protocol. In some embodiments, the switching decision can include a next or subsequent wake up time for a next or subsequent data transmission interval. The host driver on the HWD can receive the switching decision and can continue to communicate using the first communication protocol for subsequent data transmission intervals.

In some embodiments, the host driver on the device can determine to switch to the second communication protocol for a subsequent data transmission interval. The host driver on the device can receive the switching request from the HWD and may determine to switch from the first communication protocol to the second communication protocol. The device can transmit the switching decision to the host driver on the HWD during a next or subsequent system interval. The switching decision can include an instruction to switch to the second communication protocol after the next or subsequent data transmission interval has completed (e.g., 2 system interval switch). The host driver on the HWD can receive the switching decision and provide an acknowledgment message to the device. The device and HWD can switch to the second communication protocol after the next or subsequent data transmission interval has completed and/or prior to a sleep period for that respective system interval. For example, the device and HWD can communicate using the second communication protocol during a third data transmission interval or the system interval after the HWD provided the acknowledgment message.

In some embodiments, the acknowledgment message may not be received at the device (e.g., not successfully received and/or decoded at the device) or may be lost between the device and the HWD. For example, the HWD may switch to the second communication protocol, and the device, having not received the acknowledgment message, can continue to operate with the first communication protocol. The device and HWD may be unable to communicate during the next data transmission interval as they are executing different communications protocols. The host driver on the HWD can switch back to the first communication protocol, for example, responsive to detecting no traffic between the HWD and the device for a certain period of time. The HWD can re-attempt the switching request during the next data transmission interval to switch from the first communication protocol to the second communication protocol.

In some embodiments, the device can determine to switch immediately or promptly from the first communication protocol to the second communication protocol, for example (in a "panic" mode), in response to a quality level or failure of the channel between the device and the HWD. The HWD can transmit the switching request which can identify a panic reason or failure of the channel. The device can determine to switch from the first communication protocol to the second communication protocol, and can transmit the switching decision during a current data transmission interval or during a next data transmission interval based in part on an amount of time remaining for the current data transmission interval. The switching decision can include the next wake up time, activity type and/or a duration for activity using the second communication protocol. The device and HWD can switch from the first communication protocol to the second communication protocol, for example, during a sleep period of the current session interval. The device and HWD can communicate using the second communication protocol during the next system interval. In some embodiments, the device can monitor traffic on the second communication protocol to determine if the switch is complete.

In some embodiments, the HWD can transmit a switching request to switch back from the second communication protocol to the first communication protocol. The device can receive the request and determine to switch from the second communication protocol to the first communication protocol and can provide the switching decision to the HWD. The switching decision can include a time to switch from the second communication protocol to the first communication protocol and one or more link configuration settings (e.g., type of communication protocol). The device and HWD can switch during a next system interval from the second communication protocol to the first communication protocol. In some embodiments, the device can monitor traffic on the first communication protocol to determine if the switch is complete.

Referring now to FIG. 1A, an example artificial reality (e.g., virtual reality (VR), augmented reality (AR) and/or mixed reality (MR)) system 100 for switching between communication protocols is provided. In brief overview, the system 100 can include a console 102 and a head wearable display 140. The head wearable display 140 (e.g., goggle, glass, head mounted device) can pair with the console 102 (e.g., puck) to communicate or transfer data between the head wearable display 140 and the console 102, for example, for at least one user session for a user of the head wearable display 140. The user session can include or provide a VR experience, AR experience or MR experience via the head wearable display 140. The console 102 and/or the head wearable display 140 can determine to communicate through a first link 130 (e.g., primary link, initial link) and/or a second link 132 (e.g., secondary link, backup link) based in part of a type of use (e.g., type of traffic, priority of traffic) and/or a quality of a respective active link between the console 102 and the head wearable display 140. For example, the head wearable display 140 can request to switch from the first link 130 to the second link 132 or from the second link 132 to the first link 130 in response to a degradation or failure of the first link 130 or second link 132, respectively.

In some embodiments, the artificial reality system environment 100 includes a head wearable display 140 worn by a user, and a console 102 providing content of artificial reality to the head wearable display 140. The head wearable display 140 may detect its location and/or orientation of the head wearable display 140, and provide the detected location/or orientation of the head wearable display 140 to the console 102. The console 102 may generate image data indicating an image of the artificial reality according to the detected location and/or orientation of the head wearable display 140 as well as a user input for the artificial reality, and transmit the image data to the head wearable display 140 for presentation. In some embodiments, the artificial reality system environment 100 includes more, fewer, or different components than shown in FIG. 1A. In some embodiments, functionality of one or more components of the artificial reality system environment 100 can be distributed among the components in a different manner than is described here. For example, some of the functionality of the console 102 may be performed by the head wearable display 140. For example, some of the functionality of the head wearable display 140 may be performed by the console 102. In some embodiments, the console 102 is integrated as part of the head wearable display 140.

Figure 4:
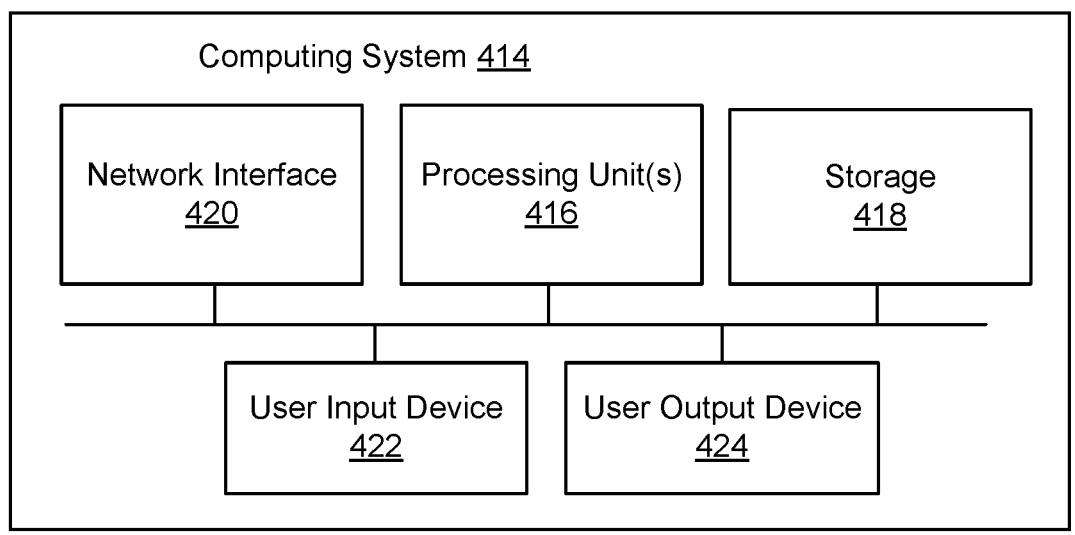
FIG. 4 is a block diagram of a computing environment according to an example implementation of the present disclosure.

Various components and elements of the artificial reality system 100 may be implemented on or using components or elements of the computing environment shown in FIG. 4 and subsequently described. For instance, the console 102 and head wearable display 140 may include or incorporate a computing system similar to the computing system 414 shown in FIG. 4 and subsequently described. The console 102 and head wearable display 140 may include one or more processing unit(s) 416, storage 418, a network interface 420, user input device 422, and/or user output device 424.

The console 102 can include a computing system or WiFi device. In some embodiments, the console 102 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head mounted device, or implemented with distributed computing devices. The console 102 can be implemented to provide VR, augmented reality (AR), and/or mixed reality (MR) experience. In some embodiments, the console 102 can include conventional, specialized or custom computer components such as processors 104, a storage device 106, a network interface, a user input device, and/or a user output device. In embodiments, the console 102 may include some elements of the device shown in FIG. 4 and subsequently described.

The head wearable display 140 can include a computing system or WiFi device. A head wearable display (HWD) may be referred to as, include, or be part of a head mounted display (HIVID), head mounted device (HIVID), head wearable device (HWD), head worn display (HWD) or head worn device (HWD). In some embodiments, the head wearable display 140 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head mounted device, or implemented with distributed computing devices. The head wearable display 140 can be implemented to provide VR, augmented reality (AR), and/or mixed reality (MR) experience to a user (e.g., wearing the display) of the head wearable display 140. In some embodiments, the head wearable display 140 can include conventional, specialized or custom computer components such as processors 104, a storage device 106, a network interface, a user input device, and/or a user output device. In embodiments, the head wearable display 140 may include some elements of the device shown in FIG. 4 and subsequently described.

The console 102 and the head wearable display 140 can include one or more processors 104. The one or more processors 104 can include any logic, circuitry and/or processing component (e.g., a microprocessor) for pre-processing input data for the console 102 and/or head wearable display 140, and/or for post-processing output data for the console 102 and/or head wearable display 140. The one or more processors 104 can provide logic, circuitry, processing component and/or functionality for configuring, controlling and/or managing one or more operations of the console 102 and/or head wearable display 140. For instance, a processor 104 may receive data and metrics, including but not limited to, characteristics 134 of a first link 130 and/or a second link 32 between the console 102 and the head wearable display 140. In some embodiments, the processors 104 can include or correspond to a driver or host driver of the console 102 and/or head wearable display 140 to execute or perform one or more portions of the processes or methods (e.g., method 300) described herein.

The console 102 and head wearable display 140 can include a storage device 106. The storage device 106 can be designed or implemented to store, hold or maintain any type or form of data associated with the console 102 and the head wearable display 140. For example, the console 102 and the head wearable display 140 can store characteristics 134 of a first link 130 and/or a second link 32 between the console 102 and the head wearable display 140, one or more requests 141 and/or one or more responses 110. The storage device 106 can include a static random access memory (SRAM) or internal SRAM, internal to the console 102. In some embodiments, the storage device 106 can be included within an integrated circuit of the console 102. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 300) described herein.

The console 102 can establish one or more links 130, 132 (e.g., first link 130, second link 132) to the head wearable display 140. In some embodiments, the head wearable display 140 can establish one or more links 130, 132 (e.g., first link 130, second link 132) to the console 102. A first link 130 can include, but not limited to, a primary link, connection (e.g., wireless connection), session (e.g., user and/or application session) and/or channel established between the console 102 and the head wearable display 140. The head wearable display 140 or the console 102 can establish the first link 130 using a first communication protocol 112. The first communication protocol 112 can include one of: IEEE 802.11 based protocol, Bluetooth based protocol, WiFi based protocol or cellular based protocol. In one embodiments, the first communication protocol 112 includes IEEE 802.11ay protocol. The head wearable display 140 and/or console 102 can use the first link 130 as a primary link to perform a data transfer (e.g., data transfer interval) between the head wearable display 140 and the console 102 and to provide or support a full VR experience, AR experience or MR experience for a user of the head wearable display 140.

A second link 132 can include, but not limited to, a secondary link, backup link, connection (e.g., wireless connection), session (e.g., user and/or application session) and/or channel established between the console 102 and the head wearable display 140. The head wearable display 140 or the console 102 can establish the second link 132 using a second communication protocol 114. The second communication protocol 114 can include one of: IEEE 802.11 based protocol, Bluetooth based protocol, WiFi based protocol or cellular based protocol. In one embodiments, the second communication protocol 114 includes IEEE 802.11ax protocol. The head wearable display 140 and/or console 102 can use the second link 132 as a secondary link to perform a data transfer (e.g., data transfer interval) between the head wearable display 140 and the console 102 and to provide or support a full VR experience, AR experience or MR experience for a user of the head wearable display 140.

In some embodiments, the second link 132 can be dis-established, inactive, on standby, or in a power saving mode when the first link 130 is active between the head wearable display 140 and the console 102. For example, the head wearable display 140 and the console 102 can communicate through the first link 130 during a first data transfer interval and the second link 132 can be in a standby mode during the first data transfer interval. In some embodiments, the first link 130 can be dis-established, inactive, on standby, or in a power saving mode when the second link 132 is active between the head wearable display 140 and the console 102. For example, the head wearable display 140 and the console 102 can communicate through the second link 132 during a second data transfer interval and the first link 130 can be in a standby mode during the second data transfer interval. The first link 130 and the second link 132 can operate in different modes, including but not limited to, different active times, different duty cycle intervals, and/or different power states.

The console 102 and/or the head wearable display 140 can monitor and/or perform measurements on the first link 130 and/or the second link 132 to determine various characteristics 134 or properties of the first link 130 and/or the second link 132 (e.g., status, quality, level of traffic). The measurements can include a wireless channel information, status measurement (e.g., on, off, activated), a level of traffic on the respective link, an availability of the respective link, a connection speed, a signal to noise ratio, a latency value, a power consumption value and/or a reliability of the respective link. In some embodiments, the measurements can include a quality measurement of the respective link. For example, the console 102 and/or the head wearable display 140 can take or perform measurements on the first link 130 and/or the second link 132 to determine one or more quality metrics or characteristics 134 for the first link 130 and/or the second link 132. The characteristics 134 can include a signal to noise ratio, a bandwidth, a latency, a transmission rate and/or a modulation and coding scheme (MCS) value of the first link 130 and/or second link 132 to determine if the quality (e.g., signal level, reliability, throughput) of the respective link is greater than a particular threshold (e.g., signal to noise ratio threshold, channel quality threshold).

The console 102 and/or head wearable display 140 can generate or establish one or more thresholds to determine if a link can support a particular type of use and/or to verify a quality of the link. For example, in some embodiments, responsive to a characteristic 134 (e.g., signal to noise ratio, level of traffic, transmission rate) of the first link 130 being less than a threshold level, the head wearable display 140 can request to switch from the first link 130 to the second link 132. In some embodiments, responsive to a characteristic 134 (e.g., signal to noise ratio, level of traffic, transmission rate, duration value) of the second link 132 being less than a threshold level, the head wearable display 140 can generate a request 141 to switch from the second link 132 to the first link 130. The request 141 can include a signal, script, code, command, and/or message transmitted from the head wearable display 140 to the console 102 through the first link 130 or the second link 132. The request 141 can include a reason (e.g., for the switch), one or more characteristics 134 of a link (e.g., first link 130, second link 132) and/or an identifier associated with the head wearable display 140.

The console 102 can generate a response 110 including a decision of whether or not to stay on a current, active link (e.g., first link 130, second link 132) or to switch from the current, active link to a different link (e.g., switch from first link 130 to second link 132, switch from second link 132 to first link 130). The response 110 can include a script, code, command, instruction and/or message transmitted from the console 102 to the head wearable display 140 through the first link 130 or the second link 132. The response 110 can include a decision, a wake up time 172 for a session interval 170, an activity type, a duration (e.g., remaining duration on a current link, duration to use a next link), one or more configuration settings (e.g., communication protocol) for a link, and/or a time value to perform a switch. In some embodiments, the head wearable display 140 can generate an acknowledgment 158 acknowledging receipt of the response 110 and can transmit the acknowledgment to the console 102 through the first link 130 or the second link 132. The acknowledgment 158 can include a signal, script, code, command, and/or message (e.g., link layer message) transmitted from the head wearable display 140 to the console 102 through the first link 130 or the second link 132.

In some embodiments, the head wearable display 140 is an electronic component that can be worn by a user and can present or provide an artificial reality experience to the user. The head wearable display 140 may render one or more images, video, audio, or some combination thereof to provide the artificial reality experience to the user. In some embodiments, audio is presented via an external device (e.g., speakers and/or headphones) that receives audio information from the head wearable display 140, the console 102, or both, and presents audio based on the audio information. In some embodiments, the head wearable display 140 includes sensors 142, eye trackers 144, a hand tracker 146, a communication interface 148, an image renderer 150, an electronic display 152, a lens 154, and a compensator 156. These components may operate together to detect a location of the head wearable display 140 and a gaze direction of the user wearing the head wearable display 140, and render an image of a view within the artificial reality corresponding to the detected location and/or orientation of the head wearable display 140. In other embodiments, the head wearable display 140 includes more, fewer, or different components than shown in FIG. 1A.

In some embodiments, the sensors 142 include electronic components or a combination of electronic components and software components that detect a location and an orientation of the head wearable display 140. Examples of the sensors 142 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 142 detect the translational movement and the rotational movement, and determine an orientation and location of the head wearable display 140. In one aspect, the sensors 142 can detect the translational movement and the rotational movement with respect to a previous orientation and location of the head wearable display 140, and determine a new orientation and/or location of the head wearable display 140 by accumulating or integrating the detected translational movement and/or the rotational movement. Assuming for an example that the head wearable display 140 is oriented in a direction 25 degrees from a reference direction, in response to detecting that the head wearable display 140 has rotated 20 degrees, the sensors 142 may determine that the head wearable display 140 now faces or is oriented in a direction 45 degrees from the reference direction. Assuming for another example that the head wearable display 140 was located two feet away from a reference point in a first direction, in response to detecting that the head wearable display 140 has moved three feet in a second direction, the sensors 142 may determine that the head wearable display 140 is now located at a vector multiplication of the two feet in the first direction and the three feet in the second direction.

In some embodiments, the eye trackers 144 include electronic components or a combination of electronic components and software components that determine a gaze direction of the user of the head wearable display 140. In some embodiments, the head wearable display 140, the console 102 or a combination of them may incorporate the gaze direction of the user of the head wearable display 140 to generate image data for artificial reality. In some embodiments, the eye trackers 144 include two eye trackers, where each eye tracker 144 captures an image of a corresponding eye and determines a gaze direction of the eye. In one example, the eye tracker 144 determines an angular rotation of the eye, a translation of the eye, a change in the torsion of the eye, and/or a change in shape of the eye, according to the captured image of the eye, and determines the relative gaze direction with respect to the head wearable display 140, according to the determined angular rotation, translation and the change in the torsion of the eye. In one approach, the eye tracker 144 may shine or project a predetermined reference or structured pattern on a portion of the eye, and capture an image of the eye to analyze the pattern projected on the portion of the eye to determine a relative gaze direction of the eye with respect to the head wearable display 140. In some embodiments, the eye trackers 144 incorporate the orientation of the head wearable display 140 and the relative gaze direction with respect to the head wearable display 140 to determine a gate direction of the user. Assuming for an example that the head wearable display 140 is oriented at a direction 30 degrees from a reference direction, and the relative gaze direction of the head wearable display 140 is −10 degrees (or 350 degrees) with respect to the head wearable display 140, the eye trackers 144 may determine that the gaze direction of the user is 20 degrees from the reference direction. In some embodiments, a user of the head wearable display 140 can configure the head wearable display 140 (e.g., via user settings) to enable or disable the eye trackers 144. In some embodiments, a user of the head wearable display 140 is prompted to enable or disable the eye trackers 144.

In some embodiments, the hand tracker 146 includes an electronic component or a combination of an electronic component and a software component that tracks a hand of the user. In some embodiments, the hand tracker 146 includes or is coupled to an imaging sensor (e.g., camera) and an image processor that can detect a shape, a location and an orientation of the hand. The hand tracker 146 may generate hand tracking measurements indicating the detected shape, location and orientation of the hand.

In some embodiments, the communication interface 148 includes an electronic component or a combination of an electronic component and a software component that communicates with the console 102. The communication interface 148 may communicate with a communication interface 116 of the console 102 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 148 may transmit to the console 102 data indicating the determined location and/or orientation of the head wearable display 140, the determined gaze direction of the user, and/or hand tracking measurement. Moreover, through the communication link, the communication interface 148 may receive from the console 102 image data indicating or corresponding to an image to be rendered and additional data associated with the image.

In some embodiments, the image renderer 150 includes an electronic component or a combination of an electronic component and a software component that generates one or more images for display, for example, according to a change in view of the space of the artificial reality. In some embodiments, the image renderer 150 is implemented as a processor (or a graphical processing unit (GPU)) that executes instructions to perform various functions described herein. The image renderer 150 may receive, through the communication interface 148, image data describing an image of artificial reality to be rendered and additional data associated with the image, and render the image through the electronic display 152. In some embodiments, the image data from the console 102 may be encoded, and the image renderer 150 may decode the image data to render the image. In some embodiments, the image renderer 150 receives, from the console 102 in additional data, object information indicating virtual objects in the artificial reality space and depth information indicating depth (or distances from the head wearable display 140) of the virtual objects. In one aspect, according to the image of the artificial reality, object information, depth information from the console 102, and/or updated sensor measurements from the sensors 142, the image renderer 150 may perform shading, reprojection, and/or blending to update the image of the artificial reality to correspond to the updated location and/or orientation of the head wearable display 140. Assuming that a user rotated his head after the initial sensor measurements, rather than recreating the entire image responsive to the updated sensor measurements, the image renderer 150 may generate a small portion (e.g., 10%) of an image corresponding to an updated view within the artificial reality according to the updated sensor measurements, and append the portion to the image in the image data from the console 102 through reprojection. The image renderer 150 may perform shading and/or blending on the appended edges. Hence, without recreating the image of the artificial reality according to the updated sensor measurements, the image renderer 150 can generate the image of the artificial reality. In some embodiments, the image renderer 150 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 152 is an electronic component that displays an image. The electronic display 152 may, for example, be a liquid crystal display or an organic light emitting diode display. The electronic display 152 may be a transparent display that allows the user to see through. In some embodiments, when the head wearable display 140 is worn by a user, the electronic display 152 is located proximate (e.g., less than 3 inches) to the user's eyes. In one aspect, the electronic display 152 emits or projects light towards the user's eyes according to image generated by the image renderer 150.

In some embodiments, the lens 154 is a mechanical component that alters received light from the electronic display 152. The lens 154 may magnify the light from the electronic display 152, and correct for optical error associated with the light. The lens 154 may be a Fresnel lens, a convex lens, a concave lens, a filter, or any suitable optical component that alters the light from the electronic display 152. Through the lens 154, light from the electronic display 152 can reach the pupils, such that the user can see the image displayed by the electronic display 152, despite the close proximity of the electronic display 152 to the eyes.

In some embodiments, the compensator 156 includes an electronic component or a combination of an electronic component and a software component that performs compensation to compensate for any distortions or aberrations. In one aspect, the lens 154 introduces optical aberrations such as a chromatic aberration, a pin-cushion distortion, barrel distortion, etc. The compensator 156 may determine a compensation (e.g., predistortion) to apply to the image to be rendered from the image renderer 150 to compensate for the distortions caused by the lens 154, and apply the determined compensation to the image from the image renderer 150. The compensator 156 may provide the predistorted image to the electronic display 152.

In some embodiments, the console 102 is an electronic component or a combination of an electronic component and a software component that provides content to be rendered to the head wearable display 140. In one aspect, the console 102 includes a communication interface 116 and a content provider 118. These components may operate together to determine a view (e.g., a FOV of the user) of the artificial reality corresponding to the location of the head wearable display 140 and the gaze direction of the user of the head wearable display 140, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the head wearable display 140 in a physical space into a virtual space (or simultaneous localization and mapping (SLAM) data), motion vector information, depth information, edge information, object information, etc. The console 102 may provide the image data and the additional data to the head wearable display 140 for presentation of the artificial reality. In other embodiments, the console 102 includes more, fewer, or different components than shown in FIG. 1A. In some embodiments, the console 102 is integrated as part of the head wearable display 140.

In some embodiments, the communication interface 116 is an electronic component or a combination of an electronic component and a software component that communicates with the head wearable display 140. The communication interface 116 may be a counterpart component to the communication interface 148 to communicate with a communication interface 116 of the console 102 through a communication link (e.g., wireless link). Through the communication link, the communication interface 116 may receive from the head wearable display 140 data indicating the determined location and/or orientation of the head wearable display 140, the determined gaze direction of the user, and the hand tracking measurement. Moreover, through the communication link, the communication interface 116 may transmit to the head wearable display 140 image data describing an image to be rendered and additional data associated with the image of the artificial reality.

The content provider 118 can include or correspond to a component that generates content to be rendered according to the location and/or orientation of the head wearable display 140. In some embodiments, the content provider 118 may incorporate the gaze direction of the user of the head wearable display 140, and a user interaction in the artificial reality based on hand tracking measurements to generate the content to be rendered. In one aspect, the content provider 118 determines a view of the artificial reality according to the location and/or orientation of the head wearable display 140. For example, the content provider 118 maps the location of the head wearable display 140 in a physical space to a location within an artificial reality space, and determines a view of the artificial reality space along a direction corresponding to the mapped orientation from the mapped location in the artificial reality space. The content provider 118 may generate image data describing an image of the determined view of the artificial reality space, and transmit the image data to the head wearable display 140 through the communication interface 116. The content provider 118 may also generate a hand model corresponding to a hand of a user of the head wearable display 140 according to the hand tracking measurement, and generate hand model data indicating a shape, a location, and an orientation of the hand model in the artificial reality space. In some embodiments, the content provider 118 may generate additional data including motion vector information, depth information, edge information, object information, hand model data, etc., associated with the image, and transmit the additional data together with the image data to the head wearable display 140 through the communication interface 116. The content provider 118 may encode the image data describing the image, and can transmit the encoded data to the head wearable display 140. In some embodiments, the content provider 118 generates and provides the image data to the head wearable display 140 periodically (e.g., every 11 ms). In one aspect, the communication interface 116 can adaptively transmit the additional data to the head wearable display 140 as described below with respect to FIGS. 2A through 4.

Figure 1B:
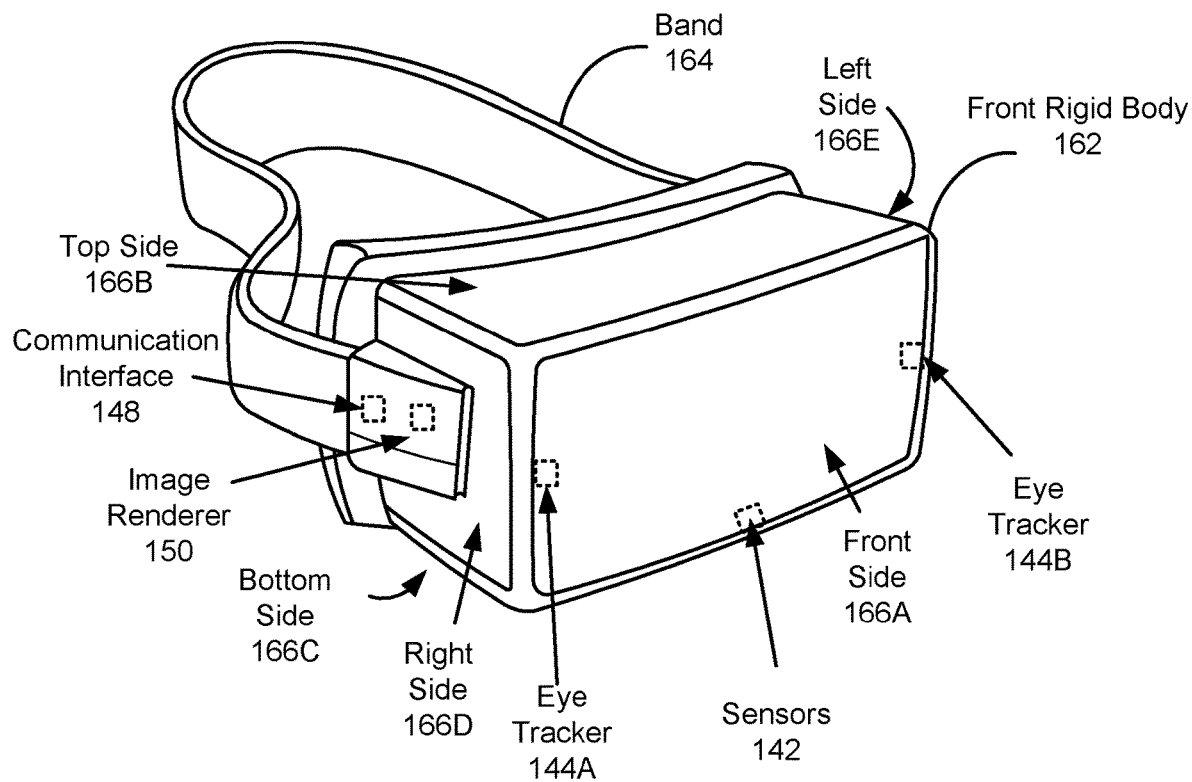
FIG. 1B is a diagram of a head wearable display, according to an example implementation of the present disclosure.

FIG. 1B is a diagram of a head wearable display 140, in accordance with an example embodiment. In some embodiments, the head wearable display 140 includes a front rigid body 162 and a band 164. The front rigid body 162 includes the electronic display 152 (not shown in FIG. 1B), the lens 154 (not shown in FIG. 1B), the sensors 142, the eye trackers 144A, 144B, the communication interface 148, and the image renderer 150. In the embodiment shown by FIG. 1B, the communication interface 148, the image renderer 150, and the sensors 142 are located within the front rigid body 162, and may not be visible to the user. In other embodiments, the head wearable display 140 has a different configuration than shown in FIG. 1B. For example, the communication interface 148, the image renderer 150, the eye trackers 144A, 144B, and/or the sensors 142 may be in different locations than shown in FIG. 1B.

Figure 2A:
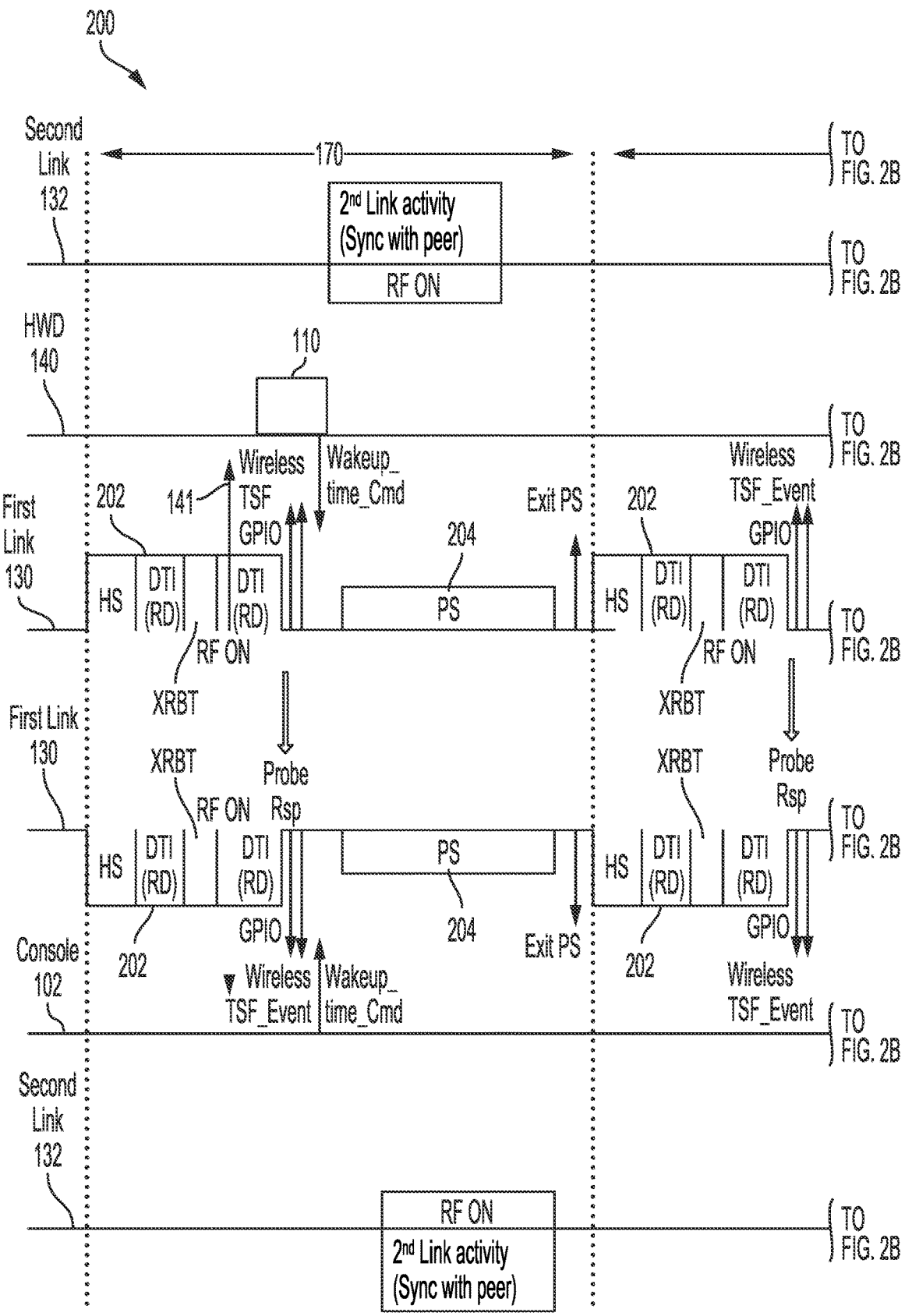
FIGS. 2A-2B is a diagram of communications between a head wearable display and a console determining to maintain a first link, according to an example implementation of the present disclosure.
Figure 2B:
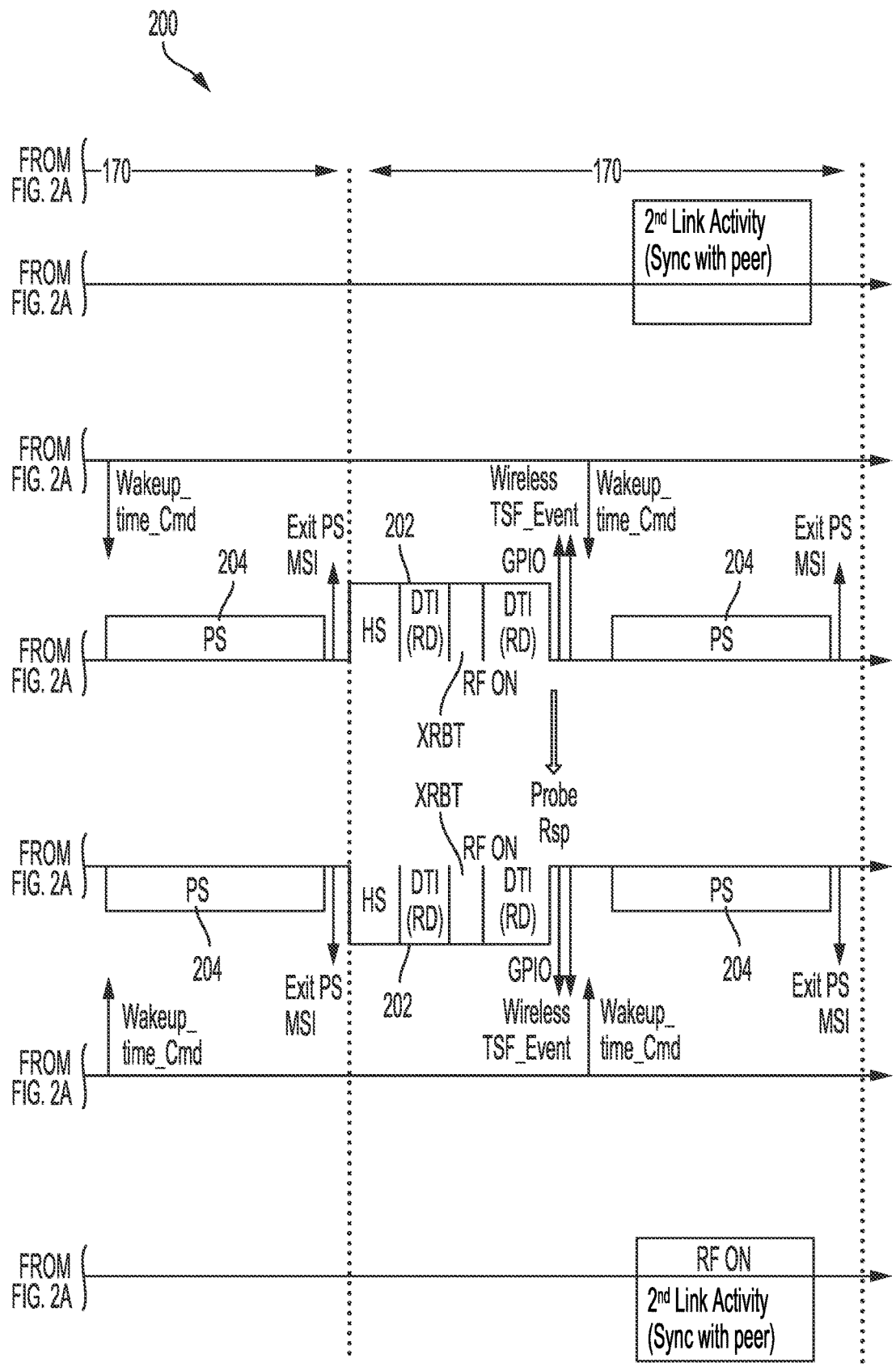

Now referring to FIGS. 2A-2B, a diagram 200 depicting a head wearable display 140 communicating with a console 102 to request to switch from a first link 130 to a second link 132 is provided. The head wearable display 140 can receive a response 110 instructing the head wearable display 140 to continue to communicate through the first link 130 and can deny the request 141 to switch from the first link 130 to the second link 132.

The head wearable display 140 can communicate with the console 102 through a first link 130 established using a first communication protocol 112 (e.g., IEEE 802.11ay protocol) during a first session interval 170. The session interval 170 can include, but is not limited to, a data transfer interval 202 and a sleep period 204. The data transfer interval 202 can include a beamforming period (e.g., with handshake signal, to establish link, to activate link) and a data transfer period to transmit to the console 102 and/or receive data from the console 102. The sleep period 204 can include an inactive period for the head wearable display 140 and/or a period when the head wearable display 140 is not communicating with the console 102.

In some embodiments, during the data transfer interval 202, the head wearable display 140 can transmit a request 141 to the console 102 to switch from the first link 130 using a first communication protocol 112 (e.g., IEEE 802.11ay protocol) to the second link 132 using a second communication protocol 114 (e.g., IEEE 802.11ax protocol). The request 141 can include one or more reasons and/or characteristics of the first link 130. For example, the reasons and/or characteristics can indicate that a quality of the first link 130 has degraded. The characteristics can include a signal to noise ratio, a bandwidth, a latency and/or a transmission rate of the first link 130. In one embodiments, the reasons and/or characteristics can indicate that a quality of the first link 130 has degraded but that the first link 130 is still functional (e.g., reduced signal to noise ratio, slower transmission rate).

The head wearable display 140 can receive a response 110 from the console 102 during the data transfer interval 202 instructing the head wearable display 140 not to switch, and to maintain communications between the head wearable display 140 and the console 102 using the first link 130. The response 110 can include a next wake up time 172 (e.g., wake up time command) for a next or subsequent session interval 170. For example, the head wearable display 140 can receive the response 110 with the wake up time through a wireless time synchronization function (TSF) time event to synchronize wake up times for the next session interval 170.

The head wearable display 140 can continue to communicate with the console 102 through the first link 130 in response to receiving the response 110. For example, and as illustrated in FIGS. 2A-2B, the head wearable display 140 can provide or enable a next data transfer interval 202 during the next and subsequent session intervals 170 using the first link 130.

Figure 2C:
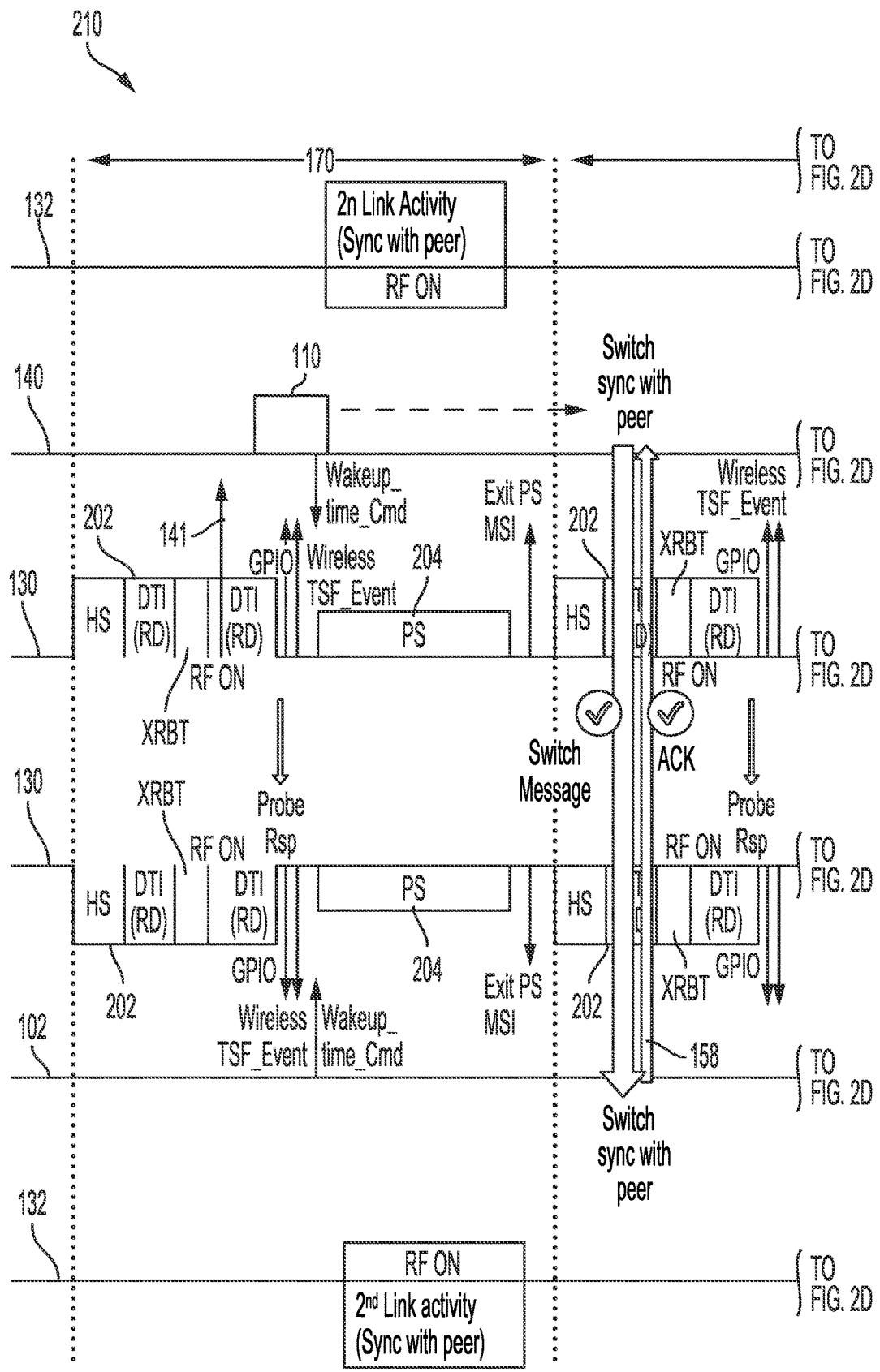
FIGS. 2C-2D is a diagram of communications between a head wearable display and a console determining to switch from a first link to second link, according to an example implementation of the present disclosure.
Figure 2D:
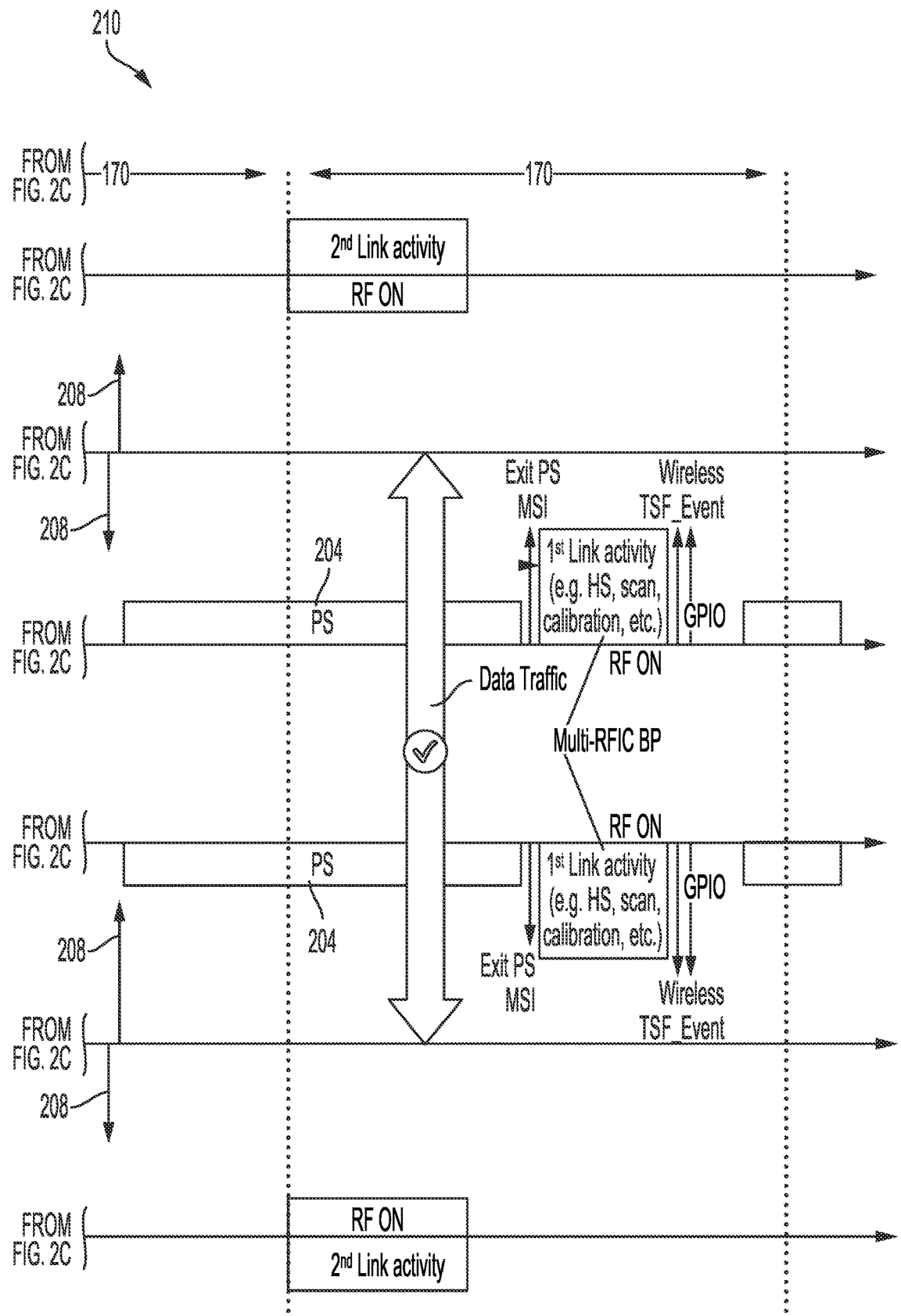

Now referring to FIGS. 2C-2D, a diagram 210 depicting a head wearable display 140 communicating with a console 102 to request to switch from a first link 130 to a second link 132 is provided. The head wearable display 140 can receive a response 110 instructing the head wearable display 140 to switch from the first link 130 to the second link 132. The head wearable display 140 can communicate with the console 102 through a first link 130 established using a first communication protocol 112 during a first session interval 170. The head wearable display 140 can transmit a request 141 to switch from the first link 130 to the second link 132 during a first session interval 170, for example, during a data transfer interval 202 of the first session interval 170. The request 141 can include one or more reasons and/or characteristics of the first link 130 (e.g., a signal to noise ratio, a bandwidth, a latency, a transmission rate).

The head wearable display 140 can receive a response 110 from the console 102 instructing the head wearable display 140 to switch from the first link 130 to the second link 132. The head wearable display 140 can receive the response 110 during a next or subsequent session interval 170 (e.g., during a next or subsequent data transfer interval 202). The head wearable display 140 can receive the response 110 during the current session interval 170 (e.g., during the current data transfer interval 202) or the head wearable display 140 can receive the response 110 during a next or subsequent session interval 170 (e.g., during a next or subsequent data transfer interval 202) based in part on an amount of time remaining in the current data transfer interval 202. For example, in one embodiment and as illustrated in FIGS. 2C-2D, the response 110 can be sent during a next data transfer interval 202 (e.g., second data transfer interval 202) of a next session interval 170 (e.g., second session interval 170) to avoid a race condition between receiving the response 110 and a probe response message used to instruct or indicate the end of the current data transfer interval 202 and the beginning of a sleep period 204 (e.g., power save mode).

The head wearable display 140 can receive the response 110 through the first link 130 or the second link 132, for example, based in part on a quality level of the first link 130 (e.g., link failure). The response 110 can include or indicate a next wake up time 172 (e.g., via a wake up time command) for a next or subsequent session interval 170 (e.g., the next session interval 170 after the respective session interval 170 during which the response 110 is received). The response 110 can include a time (e.g., time value, time period, time range) for the head wearable display 140 to perform the switch from the first link 130 to the second link 132. For example, in some embodiments, the response 110 can include a duration for remaining activity (e.g., data transfer) on the first link 130 or using the first link 130 and an activity type. The duration for activity can include or correspond to an amount of time remaining in the second or current data transfer interval 202 such that the head wearable display 140 does not switch during the second or current data transfer interval 202. The activity type can include a type of data to be transmitted between the head wearable display 140 and the console 102 and/or a type of session between the head wearable display 140 and the console 102 (e.g., data transfer, VR experience). The response 110 can include one or more configuration settings (e.g., bandwidth, latency, transmission rate, type of communication protocol) for the second link 132.

The head wearable display 140 can transmit an acknowledgment 158 responsive to receiving the response 110 during the same data transfer interval 202 and same session interval 170 that the response 110 was received. The acknowledgment 158 can include or correspond to a message, command or script indicating that the head wearable display 140 has received the response 110, when the head wearable display 140 is to switch to the second link 132 and/or the one or more configurations settings that is to be used to established or activate the second link 132.

In some embodiments, the head wearable display 140 can perform the switch from the first link 130 to the second link 132 during the second session interval 170 and after the completion of the second data transfer interval 202. For example, the head wearable display 140 can switch after completion of a current data transfer interval 202 and session interval 170 such that no packets being transmitted during the current data transfer interval 202 and session interval 170 are lost or not received at the head wearable display 140 and/or the console 102 due to the switch. The head wearable display 140 can receive a wireless time synchronization function time event command from a processor 104 of the head wearable display 140 after the completion of the second data transfer interval 202 and switch to the second link 132 according to a time indicated by the wireless time synchronization function time event command. The wireless time synchronization function time event command can include a time corresponding to the time indicated in the response 110 from the console 102. In some embodiments, the head wearable display 140 can establish or activate the second link 132 with the one or more configuration settings (e.g., second communication protocol 114). For example, in one embodiment, the head wearable display 140 can establish or activate the second link 132 using IEEE 802.11ax communication protocol. The head wearable display 140 can begin transmitting data to the console 102 and/or receiving data from the console 102 through the second link 132 during a third session interval 170 or next session interval 170 after transmitting the acknowledgment 158 to the console 102. In some embodiments, the head wearable display can transmit and/or receive data using the second link 132 in the third session interval 170 during a corresponding sleep period 204 for the first link 130.

Figure 2E:
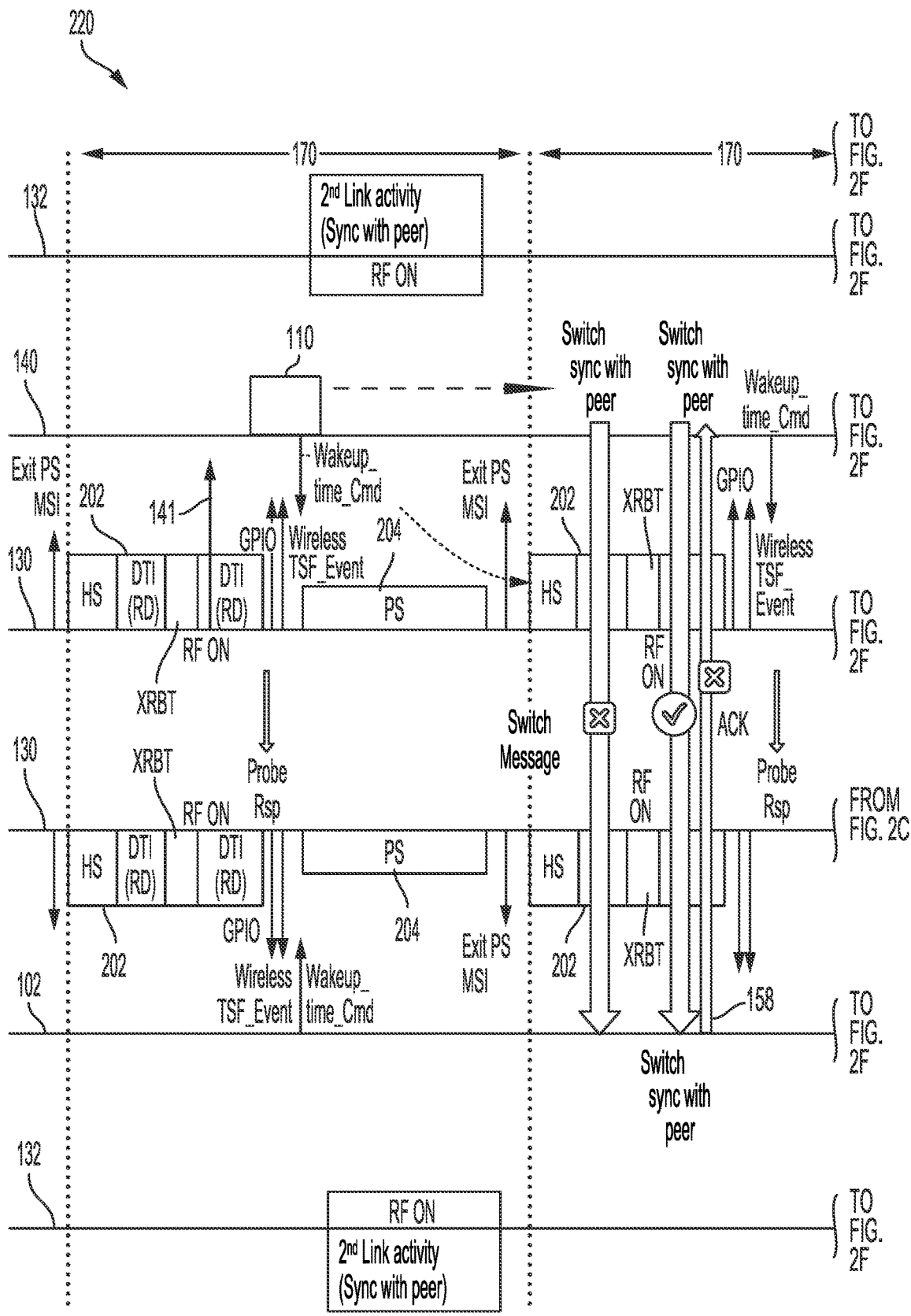
FIGS. 2E-2F is a diagram of communications between a head wearable display and a console determining an acknowledgment to switch failed to be received at the console, according to an example implementation of the present disclosure.
Figure 2F:
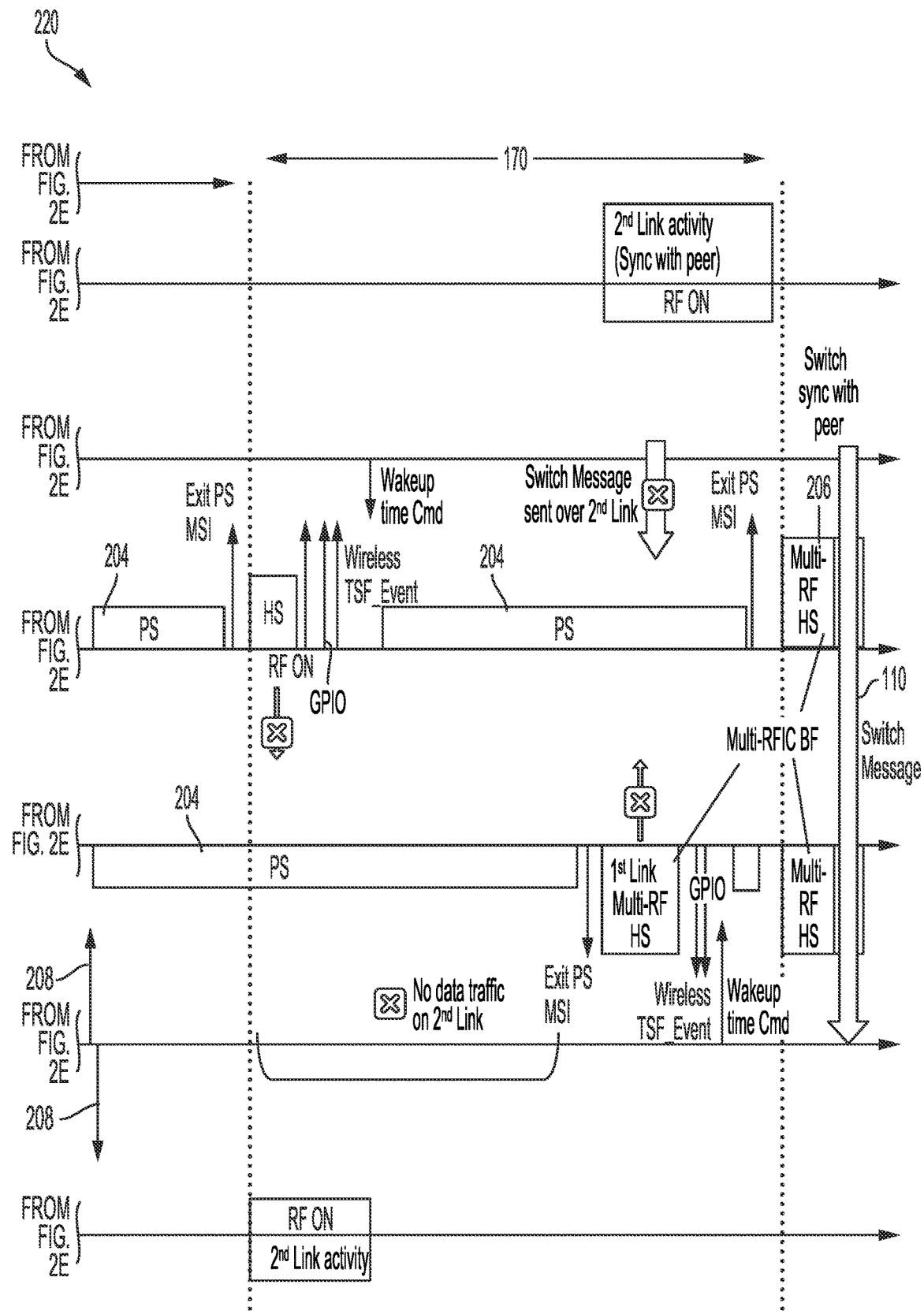

Now referring to FIGS. 2E-2F, a diagram 220 depicting a head wearable display 140 communicating with a console 102 to request to switch from a first link 130 to a second link 132 when an acknowledgment 158 is not initially received is provided. For example, the head wearable display 140 can transmit an acknowledgment 158 responsive to receiving a response 110 during a second data transfer interval 202 and a second session interval 170. The console 102 may fail to successfully receive the acknowledgment 158 (e.g., link layer acknowledgment 158) and/or the acknowledgment 158 may be lost during transmission from the head wearable display 140 to the console 102. The head wearable display 140 can switch, responsive to transmitting the acknowledgment 158, from the first link 130 to the second link 132. For example, the head wearable display 140 can perform the switch from the first link 130 to the second link 132 during the second session interval 170 and after the completion of the second data transfer interval 202.

The console 102 can wait for receipt of the acknowledgment 158 before switching from the first link 130 to the second link 132. If the console 102 does not receive the acknowledgment 158, the console 102 can stay on the first link 130 or maintain communications through the first link 130, as illustrated in FIGS. 2E-2F. In some embodiments with the console 102 using the first link 130 and the head wearable display 140 using the second link 132, no data and/or messages (e.g., IEEE 802.11ay messages, IEEE 802.11ax messages) can be communicated between the console 102 and the head wearable display 140 and result in an out of sync condition between the console 102 and the head wearable display 140. The head wearable display 140 can detect a level of traffic on the second link 132 (e.g., no traffic on the second link 132) and can determine that the acknowledgment 158 was not received by the console 102. In some embodiments, the head wearable display 140 can detect or monitor the traffic on the second link 132 during a third session interval 170 or session interval 170 after the head wearable display 140 switched from the first link 130 to the second link 132.

The head wearable display 140, to recover from the out of sync condition, can switch back from the second link 132 to the first link 130 and retransmit the initial request 141. For example, the head wearable display 140 can schedule or request a multi radio frequency beam forming 206 (e.g., multi radio frequency hand shake) between the console 102 and the head wearable display 140 during a fourth or next session interval 170 to synchronize communications between the console 102 and the head wearable display 140. The head wearable display 140 and console 102 can perform the multi radio frequency beam forming 206 during the fourth or next session interval 170 and prior to a fourth or next data transfer interval 202 using the first link 130. The head wearable display 140 can determine that both the head wearable display 140 and the console 102 are communicating using the first link 130 during the fourth session interval 170, for example, based in part on a level of traffic during the fourth data transfer interval 202 and can retransmit the request 141 to switch from the first link 130 to the second link 132.

Figure 2G:
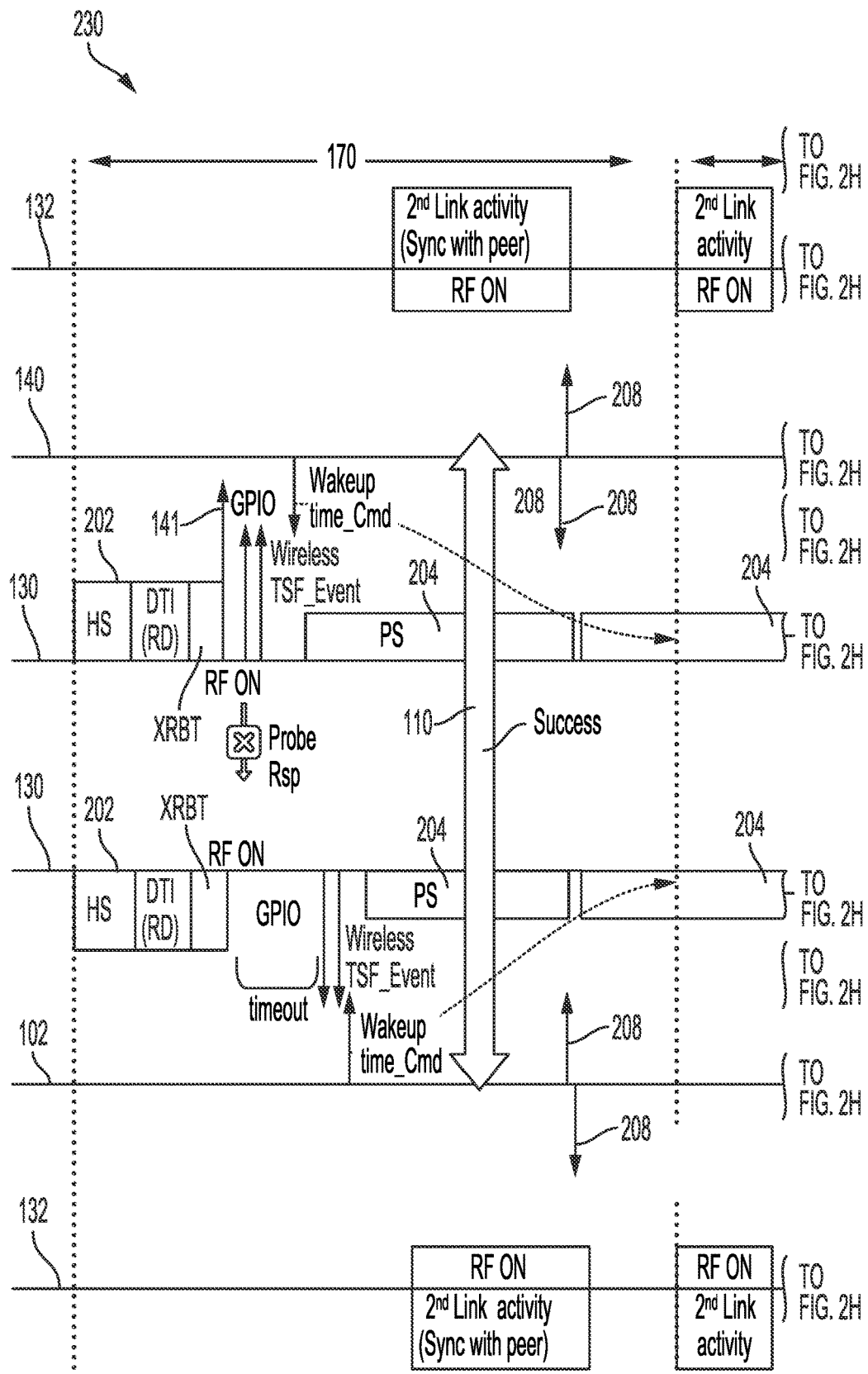
FIGS. 2G-2H is a diagram of communications between a head wearable display and a console determining to switch in a panic mode from a first link to second link, according to an example implementation of the present disclosure.
Figure 2H:
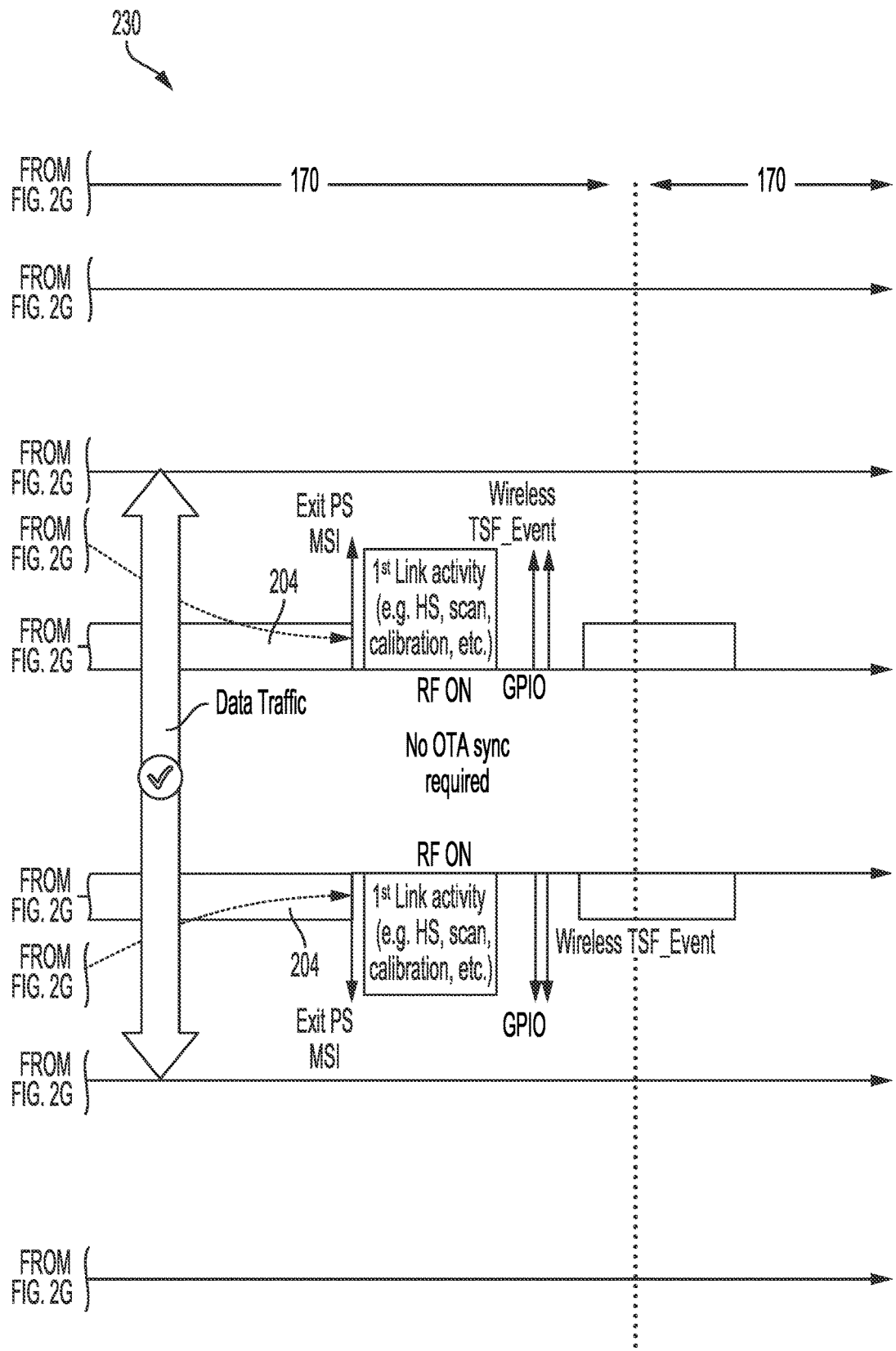

Now referring to FIGS. 2G-2H, a diagram 230 depicting a head wearable display 140 communicating with a console 102 to request to immediately (e.g., promptly or as soon as supportable) switch from a first link 130 to a second link 132 is provided. For example, the head wearable display 140 can detect a severe degradation of the first link 130, such as but not limited to, a failure of the first link 130. The head wearable display 140 can detect one or more characteristics 134 (e.g., signal to noise ratio, bandwidth, latency, transmission rate) of the first link 130 and can compare the one or more characteristics to a channel quality threshold (e.g., signal to noise ratio threshold). The one or more characteristics 134 can indicate that a quality of the first link 130 is less than the quality threshold or that the first link 130 has failed. The head wearable display 140 can transmit a request 141 to switch from the first link 130 to the second link 132 and include the one or more characteristics 134 (e.g., reasons) of the first link 130. In some embodiments, the head wearable display 140 can transmit the request 141 to switch during the current or first data transfer interval 202 of the current or first session interval 170 using the second link 132 (e.g., due to a failure of the first link 130).

The head wearable display 140 can receive a response 110 from the console 102 instructing the head wearable display 140 to switch from the first link 130 to the second link 132. The head wearable display 140 can receive the response 110 during a sleep period 204 or next scheduled second link period (e.g., next scheduled 802.11ax period) within the current or first session interval 170 through the second link 132. In some embodiments, if there is insufficient time during the current or first session interval 170 to transmit the response 110, the head wearable display 140 can receive the response 110 during a sleep period 204 or next scheduled second link period (e.g., next scheduled 802.11ax period) of a second or next session interval 170 through the second link 132.

The head wearable display 140 can receive a wireless time synchronization function time event command and a switch command 208, for example, from a processor 104 of the head wearable display 140 indicating the time for the head wearable display 140 to perform the switch from the first link 130 to the second link 132. In some embodiments, the switch command 208 can include a next wake up time 172 (e.g., wake up time command) for a next or subsequent session interval 170 (e.g., the next session interval 170 after the switch), an activity type (e.g., data transfer, type of data) and the duration for the first link activity (e.g., duration for time remaining to communicate through the first link 130).

The head wearable display 140 can switch from the first link 130 to the second link 132 during a sleep period 204 of the first or current session interval 170. The head wearable display 140 can establish or activate the second link 132 using a second communication protocol (e.g., IEEE 802.11ax protocol) or communication protocol different from the first communication protocol used for the first link 130. In some embodiments, if the response 110 was received during a second or subsequent session interval 170, the head wearable 140 can switch from the first link 130 to the second link 132 during the sleep period 204 of the second or subsequent session interval 170. If the switch occurs during a current or active data transfer interval 202, the head wearable display 140 and/or console 102 can detect any packets that may have been lost or not received at the head wearable display 140 and/or console 102 and retransmit the respective packets responsive to the switch and using the second link 132. For example, the head wearable display 140 and/or console 102 can check a transmit queue for the first link 130 and can determine if one or more packets need to be retransmitted. The head wearable display 140 and/or console 102 can include the packets, responsive to the switch to the second link 132, in a transmit queue for the second link 132 and can retransmit the packets through the second link 132.

The head wearable display 140 can perform a data transfer between the head wearable display 140 and the console 102 using the second link during a sleep period 204 for the first link 130 during the second session interval 170. The head wearable display 140 and/or the console 102 can monitor and detect a level of traffic on the second link 132 to confirm that the switch is complete. For example, the head wearable display 140 and/or the console 102 can compare the level of traffic on the second link 132 to a threshold level and if the level of traffic is greater than the threshold level the head wearable display 140 and/or the console 102 can confirm the switch is complete. If the level of traffic is less than the threshold level the head wearable display 140 and/or the console 102 can determine that the switch is not complete and retransmit the request 141 or response 110, respectively to imitate the switch again.

Figure 2I:
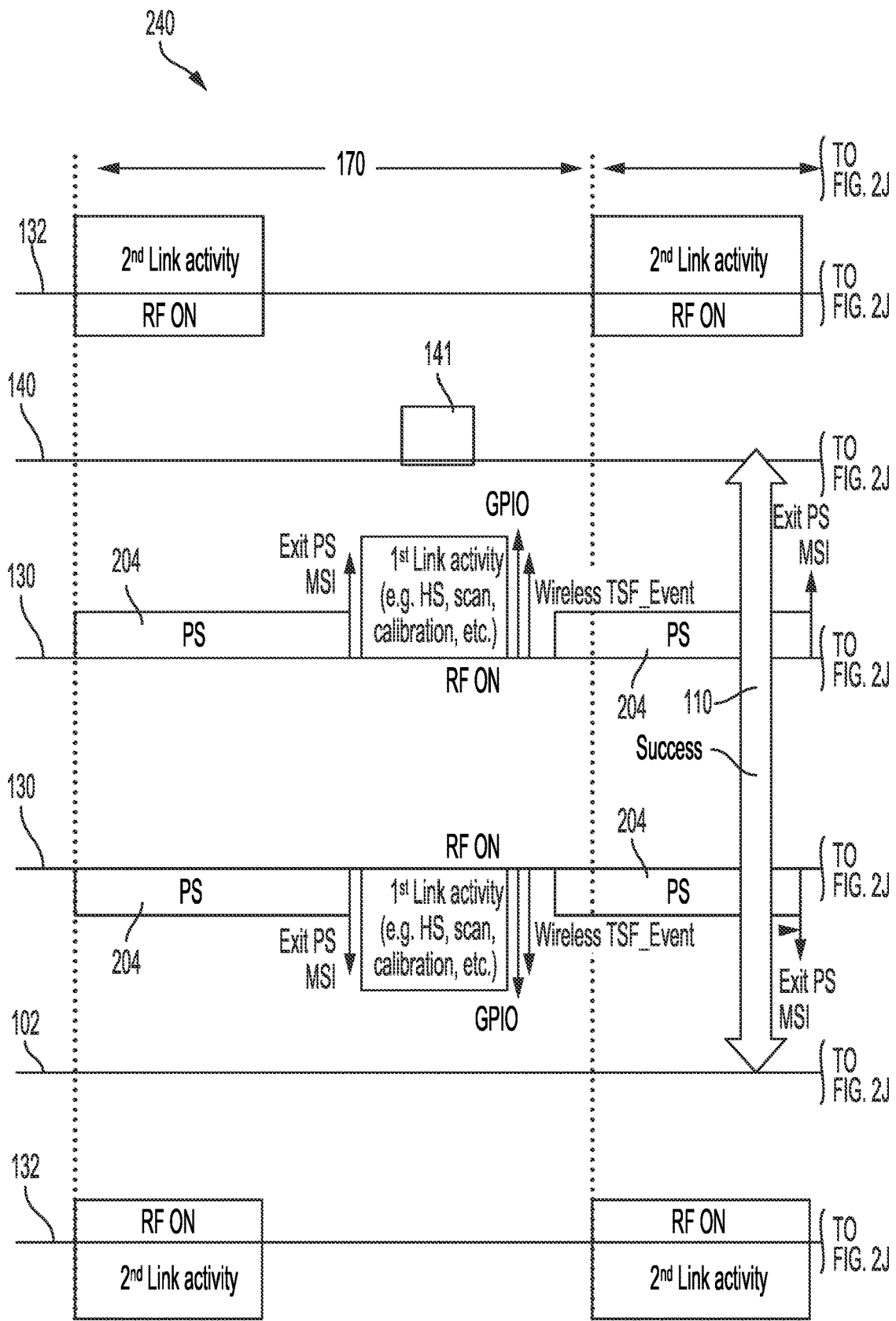
FIGS. 2I-2J is a diagram of communications between a head wearable display and a console determining to switch from a second link to first link, according to an example implementation of the present disclosure.
Figure 2J:
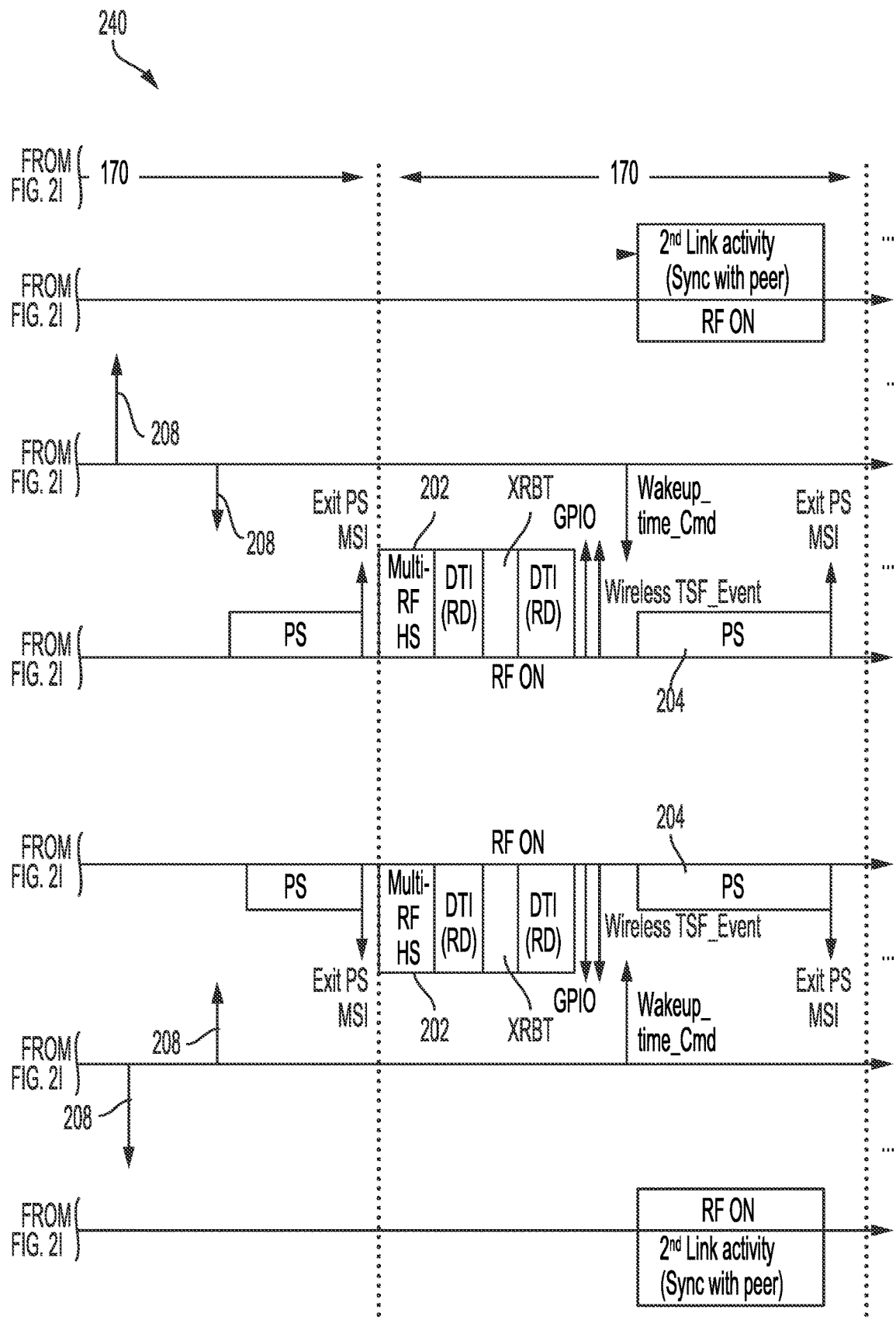

Now referring to FIGS. 2I-2J, a diagram 240 depicting a head wearable display 140 communicating with a console 102 to request to switch back from a second link 132 to a first link 130 is provided. The head wearable display 140 can transmit a request 141 to switch back from the second link 132 to the first link 130 during a data transfer interval 202 of a current session interval 170 (e.g., third session interval, fourth session interval). In some embodiments, the head wearable display 140 can transmit the request 141 in response to a duration of using the second link 132 or a quality level of the second link 132. For example, the head wearable display 140 can determine that a time limit or duration threshold for activity on the second link 132 has expired or is about to expire and can request to switch back from the second link 132 to the first link 130. The head wearable display 140 can determine that one or more characteristics 134 (e.g., signal to noise ratio, bandwidth, latency, transmission rate) of the second link 132 are less than a quality threshold for the second link 132 and request to switch back from the second link 132 to the first link 130. The request 141 can include one or more reasons (e.g., duration, quality level) and/or characteristics of the second link 132 (e.g., a signal to noise ratio, a bandwidth, a latency, a transmission rate).

The head wearable display 140 can receive a response 110 from the console 102 instructing the head wearable display 140 to switch from the second link 132 to the first link 130 through the second link 132. The head wearable display 140 can receive the response 110 during a next session interval 170 or fourth session interval 170. For example, in some embodiments, the head wearable display 140 can receive the response 110 during a sleep period 204 of the next session interval 170 or fourth session interval 170 through the second link 132. The response 110 can include a time to perform the switch and one or more configuration settings for the first link 130, including but not limited to, a communication protocol (e.g., IEEE 802.11ay protocol).

The head wearable display 140 can switch from the second link 132 to the first link 130 at the time indicated in the response 110. For example, the head wearable display 140 can switch from the second link 132 to the first link 130 after a sleep period 204 of the fourth session interval 170 or during the same session interval 170 that the response 110 was received. In some embodiments, the head wearable display 140 can receive switch command 208 that indicates the time to perform the switch from a processor 104 of the head wearable display 140 and perform the switch from the second link 132 to the first link 130 responsive to the receiving the switch command 208. The switch command 208 can include a wake up time 172 for a fifth session interval 170 or a next session interval 170 between the head wearable display 140 and the console 102.

Figure 3:
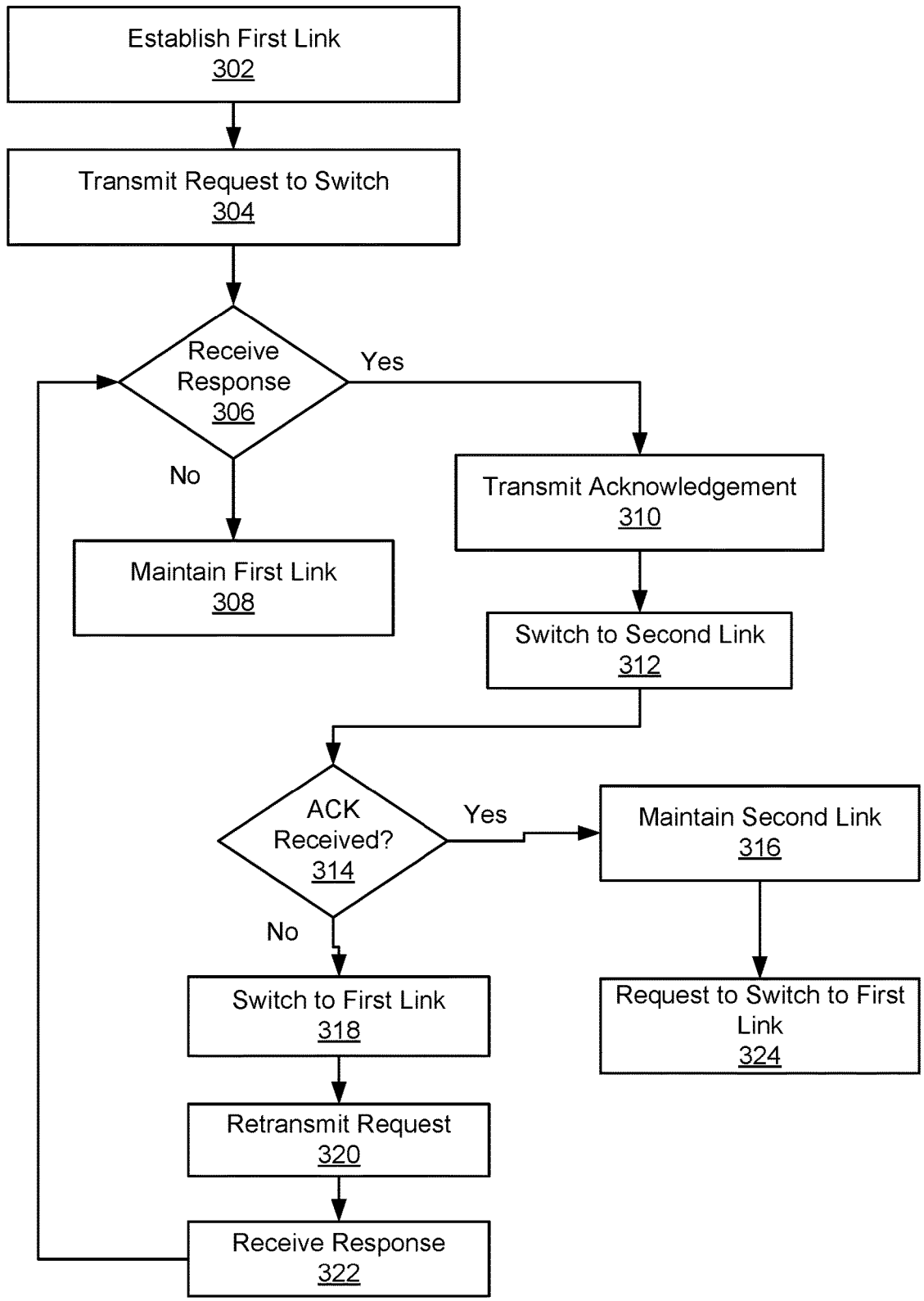
FIG. 3 includes a flow chart illustrating a process or method for switching between different communications protocols, according to an example implementation of the present disclosure.

Now referring to FIG. 3, a method 300 for switching between different communications protocols is depicted. In brief overview, the method 300 can include one or more of: establishing a first link (302), transmitting a request to switch links (304), receiving a response (306), maintaining the first link (308), transmitting an acknowledgment (310), switching to second link (312), determining if acknowledgment was received (314), maintaining the second link (316), switching back to first link (318), retransmitting the request to switch (320), receiving a response (322), and transmitting a request to switch to first link (324). Any of the foregoing operations may be performed by any one or more of the components or devices described herein, for example, the console 102 and/or the head wearable display 140.

Referring to 302, and in some embodiments, a first link 130 (e.g., primary link, initial link) can be established between a console 102 and a head wearable display 140. The first link 130 can be established by the console 102 or the head wearable display 140, for example, to perform a data transfer between the console 102 or the head wearable display 140. In some embodiments, the first link 130 can be established to provide at least one of a VR, AR, MR experience to a user of the head wearable display 140. The first link 130 can include one or more connections, sessions or channels established between the console 102 and the head wearable display 140. The first link 130 can be established using a wireless communication protocol including, but not limited to, an IEEE 802.11 based protocol, a Bluetooth based protocol, or a cellular based protocol. The first link 130 can use a different communication protocol from a second link 132 or other links established between the head wearable display 140 and the console 102. For example, in one embodiments, the first link 130 can be established using IEEE 802.11ay protocol and the second link 132 can be established using IEEE 802.11ax protocol.

Referring to 304, and in some embodiments, a request to switch can be transmitted. The head wearable display 140 can generate a request 141 to switch from the first link 130 to a second link 132. The console 102 and/or the head wearable display 140 can establish the second link 132 using a wireless communication protocol including, but not limited to, an IEEE 802.11 based protocol, a Bluetooth based protocol, or a cellular based protocol. The second link 132 can correspond to a link between the console 102 and the head wearable display 140 established using a different communications protocol from the first link 130. In some embodiments, the first link 130 and the second link 132 can be established at different times such that the first link 130 and the second link 132 are not active at the same time. In some embodiments, the first link 130 and the second link 132 can be established such that the first link 130 is a primary link and the second link 132 is a secondary link and in a standby mode when the first link 130 is active. The first link 130 can be in a standby mode when the second link 132 is active.

The head wearable display 140 can transmit, to the console during a first session interval 170, a first request 141 to switch from a first link 130 using a first communication protocol 112 to a second link 132 using a second communication protocol 114 for communications between the head wearable display 140 and the console 102. The first request can include at least one characteristic 134 of the first link 130. For example, the head wearable display 140 can detect degradation or reduction in the quality of the first link 130 according to the characteristic 134. The characteristic 134 can include a signal to noise ratio (or signal to interference and noise ratio) of the first link 130, a bandwidth, a latency, a data rate, and/or a transmission rate. In some embodiments, the head wearable display 140 can generate the request 141 in response to a loss or failure of the first link 130 between the console 102 and the head wearable display 140. The head wearable display 140 or a processor 104 (e.g., host driver) of the head wearable display 140 can transmit the request 141 to the console 102 through the first link 130 or, in cases of a failure of the first link 130, through the second link 132.

Referring to 306, and in some embodiments, a response can be received. The head wearable display 140 can receive, from the console 102, a first response 110 to the first request 141. The response 110 can include an indication, instruction or command to switch from the first link 130 to the second link 132 or maintain communications between the head wearable display 140 and the console 102 using the first link 130. The head wearable display 140 can determine whether the response 110 indicates, instructs or commands the head wearable display 140 to switch from the first link 130 to the second link 132 or maintain communications using the first link 130. In some embodiments, the response 110 can instruct the head wearable display 140 to maintain the first link 130 and the method 300 can move to (308).

In some embodiments, the head wearable display 140 can receive, from the console 102, a first response 110 to the first request 141, to perform a switch from the first link 130 to the second link 132. The first response 110 can indicate a wake up time 172 and a second session interval 170 to perform the switch. For example, the wake up time 172 can correspond to a wake up time for the head wearable display 140 to begin or initiate the second session interval 170 between the console 102 and the head wearable display 140. The method 300 can move or proceed to (310).

Referring to 308, and in some embodiments, the first link 130 can be maintained. The head wearable display 140 can receive the response 110 from the console 102 instructing the head wearable display 140 to maintain communications and subsequent session intervals 170 between the head wearable display 140 and the console 102 using the first link 130. The response 110 can include the wake up time 172 as a command to the head wearable display to instruct the head wearable display when to begin the second or next session interval 170. The head wearable display 140 can continue to communicate with the console 102 using the first link 130 and the first communication protocol 112 (e.g., 802.11ay) until the head wearable display 140 is instructed form the console 12 to switch to the second link 132 or different link.

Referring to 310, and in some embodiments, an acknowledgment can be transmitted. The head wearable display 140 can transmit an acknowledgment 158 to the console 102 confirming receipt of the first response 110 to switch from the first link 130 to the second link 132. The acknowledgment 158 can include a link layer acknowledgment transmitted to the console 102 using the first link 130 or the second link 132. The acknowledgment 158 can indicate a time that the that the head wearable display 140 is going switch from the first link 130 to the second link 132 and a session interval 170 (e.g., second session interval 170, third session interval 170) when the head wearable display 140 is going switch from the first link 130 to the second link 132.

Referring to 312, and in some embodiments, the head wearable display can switch to the second link 132. The head wearable display 140 can switch from the first link 130 to the second link 132. The head wearable display 140 can switch during a current or subsequent session interval 170 based in part on the quality level or characteristic 134 of the first link 130. In some embodiments, the head wearable display 140 can switch during a current session interval 170 in response to a failure of the first link 130 or a panic mode. For example, the head wearable display 140 can detect or determine severe link degradation on the first link 130 using one or more characteristics 134 of the first link 130 and request to switch to the second link 132 immediately or as soon as possible. The characteristics 134 can include, but not limited to, a signal to noise ratio, bandwidth, latency, or transmission rate of the first link 130.

The head wearable display 140 can determine that a first characteristic 134 of the first link 130 is less than a channel quality threshold for the first link 130. In some embodiments, the channel quality threshold can include a signal to noise ratio threshold. The head wearable display 140 can transmit, to the console 102 responsive to the first characteristic 134 being less than the channel quality threshold (e.g., signal to noise ratio threshold), a request 141 (e.g., first request, second request) to switch from the first link 130 to the second link 132. The head wearable display 140 can receive a response 110 instructing or indicating to switch from the first link 130 to the second link 132 in a current session interval or a subsequent session interval 170 (e.g., second session interval, third session interval). In some embodiments, the head wearable display 140 can receive the response 110 through the second link 132 when the first link 130 experiences severe degradation or failure. The selected session interval 170 can be selected based in part on an amount of time left in the current session interval 170 and/or an amount of time left in a current data transfer interval of the current session interval 170. For example, the head wearable display 140 can receive the response 110 and, if there is sufficient time (e.g., session interval 170 still active) during the current session interval 170, switch from the first link 130 to the second link 132 during the current session interval 170. In some embodiments, the head wearable display 140 can receive the response 110 and, if there is insufficient time (e.g., data transfer interval completed, during a current sleep period) during the current session interval 170, can switch from the first link 130 to the second link 132 during a next or subsequent session interval 170.

In some embodiments, the head wearable display 140 can switch from the first link 130 to the second link 132 in the second session interval 170 and after the wake up time 172, for communications between the head wearable display 140 and the console 102. For example, the head wearable display 140 can switch from the first link 130 to the second link 132 at the time value indicated in the response 110 or during a time range indicated in the response 110. In some embodiments, the second link 132 can be inactive, on standby when the first link 130 is active. The head wearable display 140 can deactivate a connection to the first link 130 from the head wearable display 140 end of the communication path. The head wearable display 140 can activate the second link 132, for example, by establishing a connection to the second link 132 or establishing the second link 132. The head wearable display 140 can begin transmitting data to the console 102 through the second link 132. In some embodiments, the head wearable display 140 and/or the console 102 can deactivate the first link 130 or put the first link 130 in standby mode (e.g., low power mode) prior to switching to and/or activating the second link 132.

Referring to 314, and in some embodiments, a determination can be made if the acknowledgment was received. The head wearable display 140 can monitor or detect a level of traffic on the second link 132 and use the level of traffic to determine if the acknowledgment 158 was received at the console 102. For example, the console 102 can wait to switch from the first link 130 to the second link 132 until the console 102 has received the acknowledgment 158 from the head wearable display 140. The head wearable display 140 can detect the level of traffic on the second link 132 responsive to switching to the second link 132. In some embodiments, the head wearable display 140 can detect the level of traffic on the second link 132 based in part on a number of messages, instructions, commands, requests, responses and/or data received through the second link 132.

The head wearable display 140 can compare the level of traffic to a threshold level. In some embodiments, the head wearable display 140 can detect that the level of traffic on the second link 132 is greater than the threshold level and determine that the console 102 received the acknowledgment 158 and method 300 can move to (316). In some embodiments, the head wearable display 140 can detect that the level of traffic on the second link 132 is less than a threshold level and determine, according to the level of traffic being less than the threshold level, that the console 102 failed to receive an acknowledgment 158 of the first response 110 to switch. In one embodiment, the head wearable display 140 can detect no traffic (e.g., no traffic on the second link) or receive no data through the second link 132 and determine that the console 102 failed to receive of the response 110 to switch. The method 300 can move or proceed to (318).

Referring to 316, and in some embodiments, the second link can be maintained. The head wearable display 140, for example after confirming the console 102 received the acknowledgment 158, can maintain and continue to use the second link 132 to communicate with the console 102. The head wearable display 140 can continue to communicate with the console 102 using the second link 132 and the second communication protocol 114 (e.g., 802.11ax) until the head wearable display 140 is instructed from the console 12 to switch to the first link 130 or different link. For example, the head wearable display 140 can transfer or receive data during one or more session intervals 170, including one or more subsequent data transfer intervals, between the console 102 and the head wearable display 140 using the second link 132 until instructed to switch to the first link 130.

Referring to 318, and in some embodiments, the head wearable display can switch to the first link. The head wearable display 140 can switch from the second link 132 to the first link 130 responsive to the level of traffic on the second link 132 being less than the threshold level. For example, the head wearable display 140 can determine that the console 102 is still using the first link 130 and the head wearable display 140 can recover from the out of sync scenario by switching from the second link 132 to the first link 130. The head wearable display 140 can attempt to communicate with the console 102 responsive to switching to the first link 130.

Referring to 320, and in some embodiments, the head wearable display can retransmit the request. The head wearable display 140 can perform a beam forming (e.g., multi-radio frequency integrated circuit (RFIC) beam forming 206 to begin or initiate a session interval 170 and reattempt to transmit the request 141 to switch from the first link 130 to the second link 132 to the console 102. In some embodiments, the head wearable display 140 can check or verify a level of quality of the first link 130 prior to retransmitting the request 141 to the console 102. For example, the head wearable display 140 can detect a characteristic of the first link 130 and can compare the characteristic to a threshold level (e.g., quality metric) for the first link 130 to determine if the quality of the first link 130 has improved or is sufficient to maintain communications between the head wearable display 140 and the console 102 using the first link 130. The threshold level or quality metric can include a signal to noise ratio threshold, channel quality threshold, bandwidth threshold, latency threshold or transmission rate threshold. The head wearable display 140 can compare the characteristic to the threshold level. In some embodiments, the head wearable display 140 can determine not to retransmit the request 141 in response to the characteristic being greater the threshold level. In some embodiments, the head wearable display 140 can determine to retransmit the request 141 in response to the characteristic being less than the threshold level.

Referring to 322, and in some embodiments, the head wearable display can receive a response. The head wearable display 140 can receive a response 110 from the console 102 in response to the request 141 to switch from the first link 130 to the second link 132. The method 300 can return to (306) and the head wearable display 140 can determine if the response 110 indicates to maintain communications using the first link 130 or to switch to the second link 132.

Referring to 324, and in some embodiments, a second request can be transmitted. The head wearable display 140 can transmit, to the console 102, a second request 141 (e.g., follow up request to the first request) to switch from the second link 132 to the first link 130. For example, the head wearable display 140 can request to switch back to the first link 130 after a determined period communicating using the second link 132 or based in part on a characteristic of the second link 132. The determined time period can include a single session interval 170, two or more session intervals 170 or a time period indicated in the response 110 from the console 102 instructing the head wearable display 140 to switch from the first link 130 to the second link 132. The characteristic of the second link 132 can include, but not limited to, a signal to noise ratio, a bandwidth, a latency, and/or a transmission rate. The head wearable display 140 can transmit the request to switch from the second link 132 to the first link 130 through the second link 132 or the first link 130 (e.g., failure of second link). The head wearable display 140 can receive a second response 110 from the console 102. The second response 110 can indicate, instruct or command the head wearable display to maintain communications on the second link 132 or to switch from the second link 132 to the first link 130. The method 300 can return to (306) and the head wearable display can determine whether the second response 110 indicates, instructs or commands the head wearable display to maintain communications on the second link 132 or to switch from the second link 132 to the first link 130. For example, in some embodiments, the second response 110 can instruct the head wearable display 140 to maintain communications between the console 102 and the head wearable display 140 using the second link 132. In some embodiments, the second response 110 can instruct the head wearable display 140 to switch from the second link 132 to the first link 130. The second response 110 can include or indicate a time to perform the switch and one or more configuration settings for the first link 130. The time to perform the switch can include or identify a session interval 170 to perform the switch (e.g., current session interval, subsequent session interval) and/or a particular time (e.g., time of day, time range) to perform the switch. The one or more configurations settings can include, but is not limited to, a signal to noise ratio, a communication protocol (e.g., IEEE 802.11ay, IEEE 802.11ax) a bandwidth, a latency, and/or a transmission rate. The head wearable display 140 can switch, at the indicated time, from the second link 132 to the first link 130. The first link 130 can be established with the one or more configuration settings. In some embodiments, the head wearable display 140 and/or the console 102 can deactivate the second link 132 or put the second link 132 in standby mode (e.g., low power mode) prior to switching to and/or activating the first link 130.

B. Computing System

Various operations described herein can be implemented on computer systems. FIG. 4 shows a block diagram of a representative computing system 414 usable to implement the present disclosure. In some embodiments, the console 102 and head wearable display 140 of FIGS. 1A-1B are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
    receiving, by a console from a head wearable display during a first session interval, a first request for the head wearable display to switch from a first link using a first communication protocol to a second link using a second communication protocol for communications between the head wearable display and the console, the first request including at least one characteristic of the first link; and
    transmitting, by the console to the head wearable display, a first response to the first request, to cause the head wearable display to perform a switch from the first link to the second link, the first response indicating a wake up time and a second session interval, the wake up time corresponding to a time for the head wearable display to begin or initiate the second session interval to perform the switch.

2. The method of claim 1, wherein the first communication protocol or the second communication protocol includes one of: 802.11 based protocol, Bluetooth based protocol, or cellular based protocol.

3. The method of claim 1, further comprising receiving, by the console from the head wearable display, an acknowledgement to the console confirming receipt of the first response to switch from the first link to the second link.

4. The method of claim 1, further comprising:
    determining, by the console, whether an acknowledgement to the console confirming receipt of the first response to switch from the first link to the second link is received; and responsive to determining that an acknowledgement to the console confirming receipt of the first response is not received, continuing, by the console, to operate with the first communication protocol.

5. The method of claim 4, further comprising:
responsive to determining that an acknowledgement to the console confirming receipt of the first response is received, switching, by the console, from the first link to the second link.

6. The method of claim 4, further comprising:
responsive to determining that an acknowledgement to the console confirming receipt of the first response is not received, receiving, by the console from the head wearable display, the first request for the head wearable display to switch from the first link to the second link; and
transmitting, by the console to the head wearable display, a second response to switch from the first link to the second link.

7. The method of claim 1, further comprising:
receiving, by the console from the head wearable display, a second request for the head wearable display to switch from the first link to the second link, the second request including a first characteristic of the first link in a third session interval is less than a channel quality threshold for the first link.

8. The method of claim 7, further comprising:
transmitting, by the console to the head wearable display, a second response to the second request for the head wearable display to switch from the first link to the second link in the third session interval.

9. The method of claim 7, further comprising:
transmitting, by the console to the head wearable display, a second response to the second request for the head wearable display to switch from the first link to the second link during a fourth session interval.

10. The method of claim 1, further comprising:
receiving, by the console from the head wearable display, a second request for the head wearable display to switch from the second link to the first link; and
transmitting, by the console to the head wearable display, a second response to the second request for the head wearable display to switch from the second link to the first link, the second response indicating a time to perform the switch and one or more configuration settings for the first link.

11. A console comprising:
at least one processor configured to:
receive, from a head wearable display during a first session interval, a first request for the head wearable display to switch from a first link using a first communication protocol to a second link using a second communication protocol for communications between the head wearable display and the console, the first request including at least one characteristic of the first link; and
transmit, to the head wearable display, a first response to the first request, to cause the head wearable display to perform a switch from the first link to the second link, the first response indicating a wake up time and a second session interval, the wake up time corresponding to a time for the head wearable display to begin or initiate the second session interval to perform the switch.

12. The console of claim 11, wherein the first communication protocol or the second communication protocol includes one of: 802.11 based protocol, Bluetooth based protocol, or cellular based protocol.

13. The console of claim 11, wherein the at least one processor is further configured to:
receive, from the head wearable display, an acknowledgement to the console confirming receipt of the first response to switch from the first link to the second link.

14. The console of claim 11, wherein the at least one processor is further configured to:
determine whether an acknowledgement to the console confirming receipt of the first response to switch from the first link to the second link is received; and
responsive to determining that an acknowledgement to the console confirming receipt of the first response is not received, continue to operate with the first communication protocol.

15. The console of claim 14, wherein the at least one processor is further configured to:
responsive to determining that an acknowledgement to the console confirming receipt of the first response is received, switch from the first link to the second link.

16. The console of claim 14, wherein the at least one processor is further configured to:
responsive to determining that an acknowledgement to the console confirming receipt of the first response is not received, receive the first request for the head wearable display to switch from the first link to the second link; and
transmit, to the head wearable display, a second response to switch from the first link to the second link.

17. The console of claim 11, wherein the at least one processor is further configured to:
receive, from the head wearable display, a second request for the head wearable display to switch from the first link to the second link, the second request including a first characteristic of the first link in a third session interval is less than a channel quality threshold for the first link.

18. The console of claim 17, wherein the at least one processor is further configured to:
transmit, to the head wearable display, a second response to the second request for the head wearable display to switch from the first link to the second link in the third session interval.

19. The console of claim 17, wherein the at least one processor is further configured to:
transmit, to the head wearable display, a second response to the second request for the head wearable display to switch from the first link to the second link during a fourth session interval.

20. The console of claim 11, wherein the at least one processor is further configured to:
receive, by the console from the head wearable display, a second request for the head wearable display to switch from the second link to the first link; and
transmit, to the head wearable display, a second response to the second request for the head wearable display to switch from the second link to the first link, the second response indicating a time to perform the switch and one or more configuration settings for the first link.

* * * * *